(12) United States Patent
Furuichi

(10) Patent No.: US 11,388,611 B2
(45) Date of Patent: Jul. 12, 2022

(54) COMMUNICATION CONTROL APPARATUS AND COMMUNICATION CONTROL METHOD

(71) Applicant: SONY CORPORATION, Tokyo (JP)

(72) Inventor: Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,293

(22) PCT Filed: Jun. 6, 2019

(86) PCT No.: PCT/JP2019/022600
§ 371 (c)(1),
(2) Date: Dec. 29, 2020

(87) PCT Pub. No.: WO2020/008800
PCT Pub. Date: Jan. 9, 2020

(65) Prior Publication Data
US 2021/0274357 A1 Sep. 2, 2021

(30) Foreign Application Priority Data

Jul. 6, 2018 (JP) .............................. JP2018-129431

(51) Int. Cl.
*H04W 16/14* (2009.01)
*H04W 72/04* (2009.01)
(Continued)

(52) U.S. Cl.
CPC ........... *H04W 16/18* (2013.01); *H04W 16/14* (2013.01); *H04W 24/08* (2013.01); *H04W 52/243* (2013.01); *H04W 72/0453* (2013.01)

(58) Field of Classification Search
CPC ............... H04W 16/14; H04W 72/082; H04W 72/0453; H04L 5/0073
See application file for complete search history.

(56) References Cited

U.S. PATENT DOCUMENTS

2010/0093338 A1 4/2010 Kobayashi et al.
2013/0217429 A1 8/2013 Kimura et al.
(Continued)

FOREIGN PATENT DOCUMENTS

CN 101637042 A 1/2010
CN 103181205 A 6/2013
(Continued)

OTHER PUBLICATIONS

"Interference estimation options and configuration in NR", Nokia, Alcatel-Lucent Shanghai Bell, 3GPP TSG RAN WG1, 89th Meeting, Hangzhou, P.R. China, R1-1708917, XP051274095, May 15-19, 2017, 06 pages.

(Continued)

*Primary Examiner* — Kevin Kim
(74) *Attorney, Agent, or Firm* — Chip Law Group

(57) ABSTRACT

A communication control apparatus includes an acquisition unit that acquires information on a plurality of second wireless systems that perform wireless communication by utilizing a radio wave of a frequency band used by a first wireless system, a first determination unit that determines, based on the information on the second wireless systems, an operation parameter regarding radio transmission of each of the second wireless systems so as to satisfy a protection standard regarding interference of the radio wave of the first wireless system, a calculation unit that calculates a residual interference quantity that is allowed to be additionally allocated to the second wireless systems based on the operation parameter determined by the first determination unit and the protection standard of the first wireless system, a classification unit that classifies the second wireless systems into a single or a plurality of sets.

20 Claims, 16 Drawing Sheets

(51) Int. Cl.
*H04W 16/18* (2009.01)
*H04W 24/08* (2009.01)
*H04W 52/24* (2009.01)

(56) References Cited

U.S. PATENT DOCUMENTS

| | | |
|---|---|---|
| 2014/0341150 A1 | 11/2014 | Kimura et al. |
| 2016/0006522 A1 | 1/2016 | Furuichi et al. |
| 2016/0128000 A1 | 5/2016 | Furuichi et al. |

FOREIGN PATENT DOCUMENTS

| | | | |
|---|---|---|---|
| CN | 104054367 A | 9/2014 | |
| CN | 105165049 A | 12/2015 | |
| CN | 105453628 A | 3/2016 | |
| EP | 1890433 A2 * | 2/2008 | ............ H04W 16/14 |
| EP | 2608592 A1 | 6/2013 | |
| EP | 2809096 A1 | 12/2014 | |
| EP | 2996373 A1 | 3/2016 | |
| EP | 3038400 A1 | 6/2016 | |
| JP | 2012-151815 A | 8/2012 | |
| JP | 5152176 B2 | 2/2013 | |
| JP | 5768812 B2 | 8/2015 | |
| JP | 2016-123110 A | 7/2016 | |
| JP | 2018-085766 A | 5/2018 | |
| WO | 2008/114578 A1 | 9/2008 | |
| WO | 2012/056828 A1 | 5/2012 | |
| WO | 2013/111442 A1 | 8/2013 | |
| WO | 2014/006802 A1 | 1/2014 | |
| WO | 2014/181580 A1 | 11/2014 | |
| WO | 2015/025605 A1 | 2/2015 | |

OTHER PUBLICATIONS

Extended European Search Report of EP Application No. 19831352.0, dated Jul. 16, 2021, 08 pages.

International Search Report and Written Opinion of PCT Application No. PCT/JP2019/022600, dated Aug. 6, 2019, 09 pages of ISRWO.

* cited by examiner

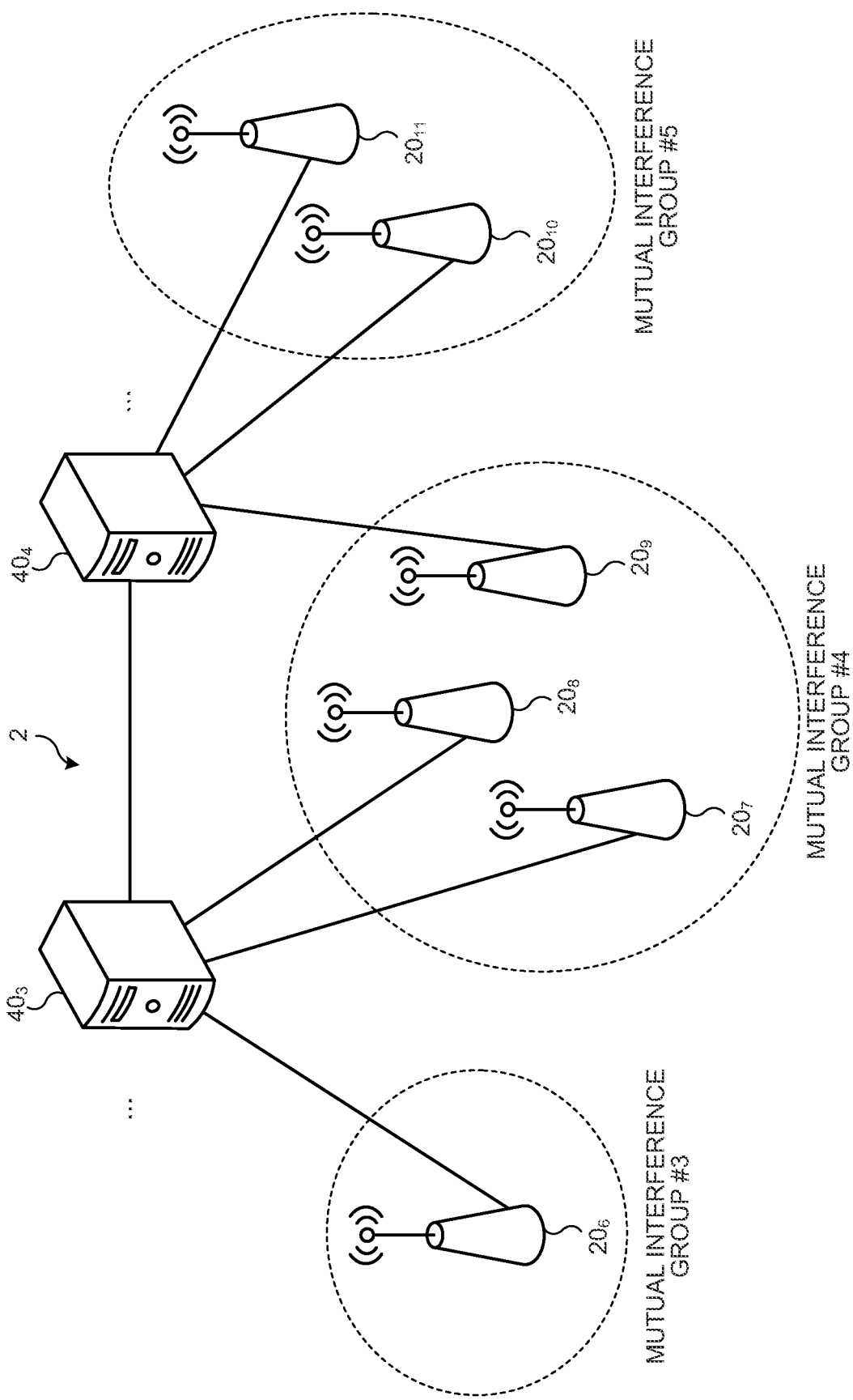

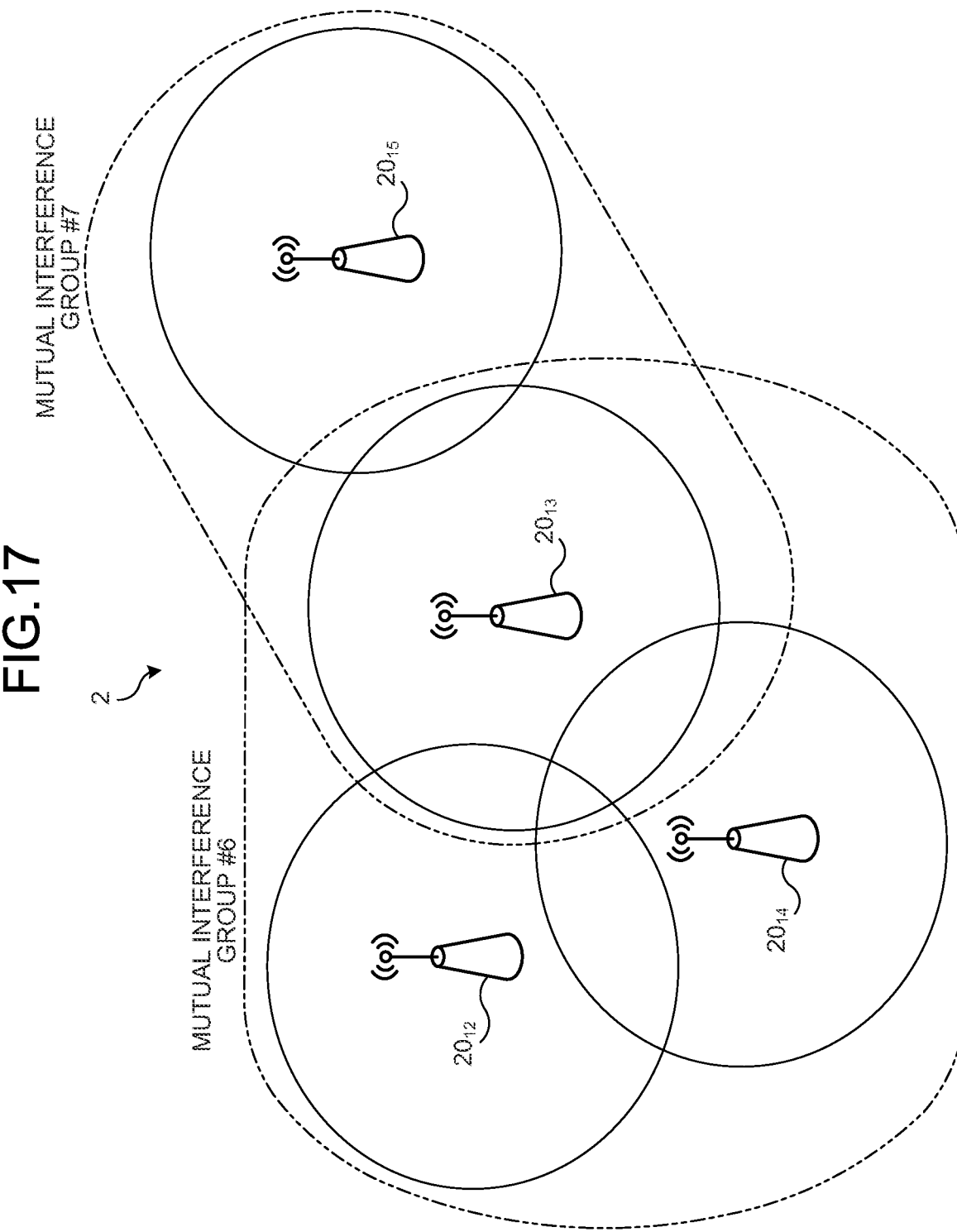

COMMUNICATION CONTROL APPARATUS AND COMMUNICATION CONTROL METHOD

CROSS REFERENCE TO RELATED APPLICATIONS

This application is a U.S. National Phase of International Patent Application No. PCT/JP2019/022600 filed on Jun. 6, 2019, which claims priority benefit of Japanese Patent Application No. JP 2018-129431 filed in the Japan Patent Office on Jul. 6, 2018. Each of the above-referenced applications is hereby incorporated herein by reference in its entirety.

FIELD

The present disclosure relates to a communication control apparatus and a communication control method.

BACKGROUND

Scarcity of radio frequency resources (wireless resources) that can be allocated to wireless systems (wireless apparatuses) has come to the surface as an issue. Incumbent wireless systems (wireless apparatuses) are already in use of every radio band, so that it is difficult to allocate the radio frequency resources to wireless systems anew. Thus, in recent years, more effective utilization of radio frequency resources by active use of a cognitive radio technology has started to attract attention. With the cognitive radio technology, timewise and spacewise underutilized radio waves (White Space) of the incumbent wireless systems are utilized to manage to have radio frequency resources.

CITATION LIST

Patent Literature

Patent Literature 1: Japanese Patent No. 5768812

SUMMARY

Technical Problem

However, it is not necessarily possible to achieve effective utilization of radio frequency resources simply by using the underutilized radio waves. For example, even though it is necessary to distribute underutilized radio waves efficiently to a plurality of wireless systems (wireless apparatuses) in order to achieve effective utilization of the radio frequency resources, it is not easy to efficiently distribute the underutilized radio waves since there are various wireless systems.

Therefore, the present disclosure proposes a communication control apparatus and a communication control method capable of achieving effective utilization of radio frequency resources.

Solution to Problem

To solve the above problems, a communication control apparatus according to an embodiment includes: an acquisition unit that acquires information on a plurality of second wireless systems that perform wireless communication by utilizing a radio wave of a frequency band used by a first wireless system; a first determination unit that determines, based on the information on the second wireless systems, an operation parameter regarding radio transmission of each of the second wireless systems so as to satisfy a protection standard regarding interference of the radio wave of the first wireless system; a calculation unit that calculates a residual interference quantity that is allowed to be additionally allocated to the second wireless systems based on the operation parameter determined by the first determination unit and the protection standard of the first wireless system; a classification unit that classifies the second wireless systems into a single or a plurality of sets; and a second determination unit that determines, based on information on the residual interference quantity, an adjustment quantity of the operation parameter of the second wireless system belonging to a prescribed set out of the single or plurality of sets.

Advantageous Effects of Invention

According to the present disclosure, it is possible to achieve effective utilization of the radio frequency resources. Note that the effects described herein are not necessarily limited but may include any of the effects described in the present disclosure.

BRIEF DESCRIPTION OF DRAWINGS

FIG. 16 is a diagram illustrating an example of a configuration of a communication system according to the embodiment of the present disclosure.

FIG. 17 is a diagram illustrating an example of a configuration of a communication system 2 according to the embodiment of the present disclosure.

DESCRIPTION OF EMBODIMENT

Figure 1:
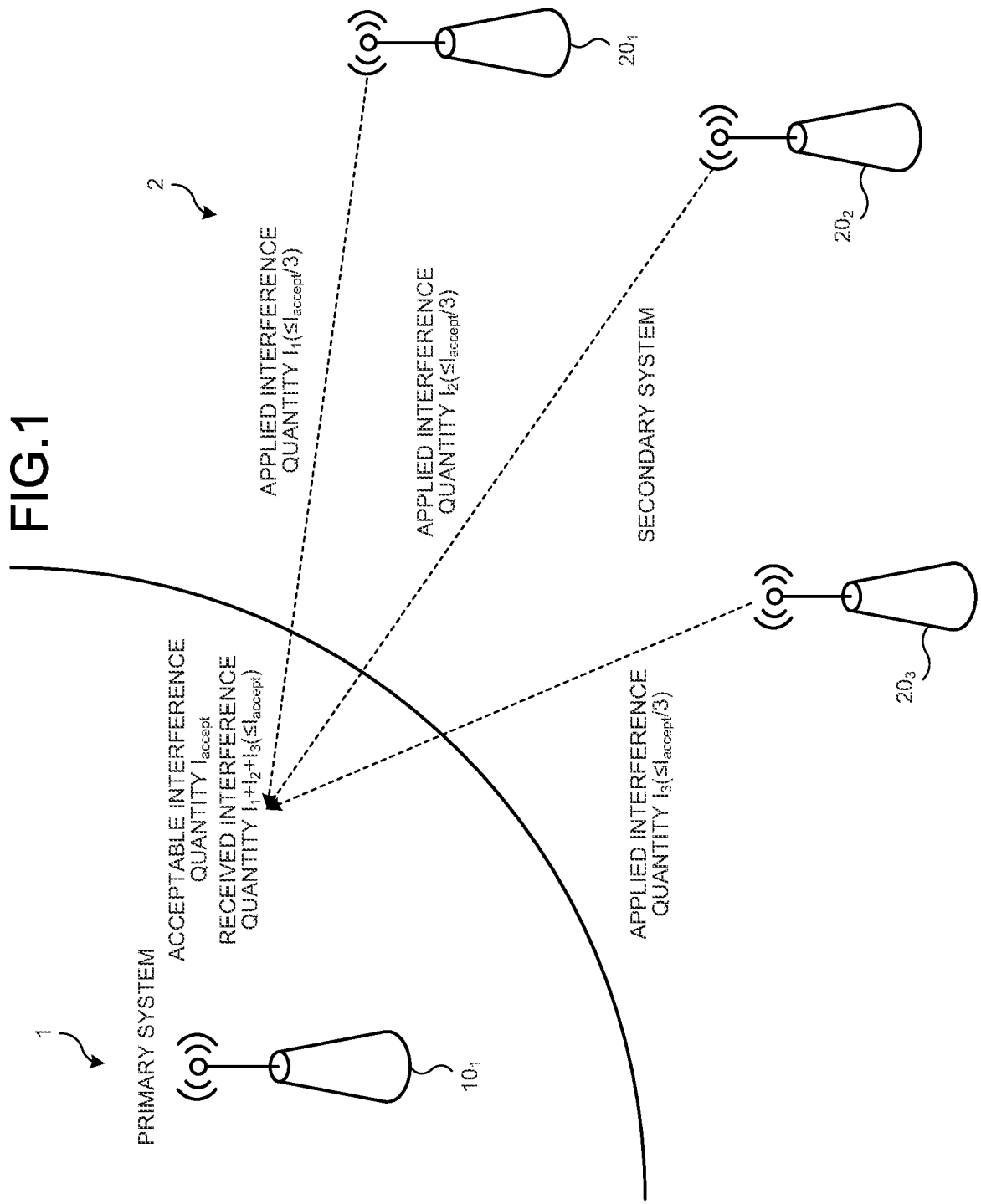
FIG. 1 is an explanatory diagram illustrating an example of distribution of interference margins to each of communication devices configuring a secondary system.

Hereinafter, an embodiment of the present disclosure will be described in detail based on the accompanying drawings. In each of the following embodiments, same reference signs are applied to the same components to avoid duplicated explanations.

Furthermore, in the specification and the drawings, a plurality of constituent elements having substantially the same functional configuration may be distinguished by adding different numerals after the same reference sign. For example, a plurality of constitutions having substantially the same functional configuration are distinguished like communication control apparatuses 40₁ and 40₂ as necessary. However, when it is not specifically necessary to distinguish each of the constituent elements having substantially the same functional configuration, only the same reference sign is applied. For example, when it is not specifically necessary to distinguish the communication control apparatuses 40₁ and 40₂, those are simply referred to as communication control apparatuses 40.

Furthermore, the present disclosure will be described according to the order of items as follows.

1. Introduction
2. Configuration of Communication System
2-1. Overall Configuration of Communication System
2-2. Configuration of Communication Device
2-3. Configuration of Terminal Device
2-4. Configuration of Communication Control Apparatus
3. Residual Interference Margin
3-1. Interference Model
3-2. Calculation Example of Residual Interference Margin
4. Operations of Communication System
4-1. Communication Control Processing
4-2. Example of Adjustment Processing
4-3. Example of Distribution Processing
4-4. Example of Determination Processing
5. Modification
5-1. Further Information Exchange among Communication Control Apparatuses
5-2. Avoidance of Collision as Determination Result among Communication Control Apparatuses
5-3. Interference to Primary System to be Considered
5-4. Case Including Communication Device Causing Interference to a Plurality of Primary Systems
5-5. Case where Communication Device Belongs to a Plurality of Mutual Interference Groups
5-6. Modification regarding System Configuration
5-7. Another Modification
6. Conclusion

1. Introduction

In recent years, scarcity of radio frequency resources (for example, frequencies) that can be allocated to wireless systems has come to the surface as an issue. However, incumbent wireless systems (wireless apparatuses) are already in use of every radio band, so that it is difficult to allocate new radio frequency resources. Thus, in recent years, more effective utilization of radio frequency resources by active use of a cognitive radio technology has started to attract attention.

With the cognitive radio technology, timewise and spacewise underutilized radio waves (White Space) of the incumbent wireless systems are used (for example, Dynamic Spectrum Access (DSA)) to manage to have radio frequency resources. For example, in the United States, legislation and standardization of CBRS (Citizens Broadband Radio Service) actively utilizing a frequency sharing technology are accelerated so as to open, to the general public, Federal use band (3.55 to 3.70 GHz) that overlaps the frequency band defined to be 3GPP bands 42 and 43 worldwide.

The cognitive radio technology contributes not only to Dynamic Spectrum Access but also to improving the frequency use efficiency of the wireless systems. For example, in ETSI EN 303 387 and IEEE 802.19.1-2014, a coexistence technology among wireless systems using underutilized radio waves is defined.

In order to achieve frequency sharing, it is important for communication control apparatuses (for example, frequency management databases) to control communication of a secondary system so as not to give a critical interference to a primary system. The communication control apparatus is an apparatus that manages communication and the like of a communication device. For example, the communication control apparatus is an apparatus (system) for managing radio frequency resources (for example, frequencies) such as GLDB (Geo-location Database) and SAS (Spectrum Access System). In the case of the embodiment, the communication control apparatus corresponds to a communication control apparatus 40 (for example, communication control apparatuses 40₁, 40₂ illustrated in FIG. 4) to be described later. The communication control apparatus 40 will be described in detail later.

Note here that the primary system is a system (for example, an incumbent system) that is given a priority over other systems such as a secondary system to use radio waves of a prescribed frequency band. Furthermore, the secondary system is a system that secondarily utilizes the radio waves in the frequency band used by the primary system (for example, Dynamic Spectrum Access), for example. Each of the primary system and the secondary system may be configured with a plurality of communication devices or a single communication device. The communication control apparatus distributes an acceptable interference quantity to a single or a plurality of communication devices such that an interference aggregation for a single or a plurality of communication devices configuring the secondary system does not exceed the acceptable interference quantity (also referred to as an interference margin) of the primary system. At this time, the acceptable interference quantity may be an interference quantity that is defined in advance by the operator of the primary system or a public organization or the like that manages the radio waves. In the explanation below, "interference margin" means an acceptable interference quantity. Furthermore, the interference aggregation may also be referred to as a cumulative applied interference power.

FIG. 1 is an explanatory diagram illustrating an example of distribution of interference margins to each of the communication devices configuring the secondary system. In the example of FIG. 1, a communication system 1 is the primary system, and a communication system 2 is the secondary system. The communication system 1 includes a communication device 10₁ and the like. Furthermore, the communication system 2 includes communication devices 20₁, 20₂, 20₃, and the like. While the communication system 1 includes only a single communication device 10 in the example of FIG. 1, there may be a plurality of communication devices 10 in the communication system 1. Furthermore, while the communication system 2 includes three communication devices 20 in the example of FIG. 1, there may be less or more than three communication devices 20 in the communication system 2. While there are only one each of the primary system (the communication system 1 in the example of FIG. 1) and the secondary system (the communication system 2 in the example of FIG. 1) illustrated in the example of FIG. 1, there may be a plurality of primary systems and secondary systems.

Each of the communication device 10₁ and the communication devices 20₁, 20₂, and 20₃ is capable of transmitting and receiving radio waves. The interference quantity acceptable to the communication device 10₁ is expressed by $I_{accept}$. Furthermore, the interference quantities given to a prescribed protection point of the communication system 1 (primary system) from the communication devices 20₁, 20₂, and 20₃ are applied interference quantities $I_1$, $I_2$, and $I_3$, respectively. Note here that the protection point is an interference calculation reference point for protecting the communication system 1.

The communication control apparatus distributes the interference margin $I_{accept}$ to the communication devices 20 such that the interference aggregation (received interference quantity $I_1+I_2+I_3$ illustrated in FIG. 1) for the prescribed protection point of the communication system 1 does not exceed the interference margin $I_{accept}$. For example, the communication control apparatus distributes the interference margin $I_{accept}$ to each of the communication devices 20 such that each of the applied interference quantities $I_1$, $I_2$, and $I_3$ becomes $I_{accept}/3$. Alternatively, the communication control apparatus distributes the interference margin $I_{accept}$ to each of the communication devices 20 such that each of the applied interference quantities $I_1$, $I_2$, and $I_3$ becomes smaller than $I_{accept}/3$. Naturally, the manner of distributing the interference margin is not limited to such examples.

The communication control apparatus calculates the maximum transmission power accepted by each of the communication devices 20 (referred to as the maximum acceptable transmission power hereinafter) based on the distributed interference quantities (referred to as distributed interference quantities hereinafter). For example, the communication control apparatus calculates the maximum acceptable transmission power of each of the communication devices 20 by calculating backwards from the distributed interference quantity based on propagation loss, antenna gain, and the like. Then, the communication control apparatus notifies information on the calculated maximum acceptable transmission power to each of the communication devices 20.

Even if the information on the maximum acceptable transmission power is notified from the communication control apparatus, each of the communication devices 20 may not necessarily apply the notified maximum acceptable transmission power. For example, due to the following reasons (R1) to (R4), it is assumed that each of the communication devices 20 does not apply the maximum acceptable transmission power notified from the communication control apparatus.

(R1) Due to hardware constraints of the communication device 20, the communication device 20 can transmit radio waves only with the transmission power less than the maximum acceptable transmission power.

(R2) While the maximum acceptable transmission power can be applied in terms of the hardware constraints of the communication device 20, the communication device 20 has not passed a spectrum mask test (carried out by a public organization) for a case applying the maximum acceptable transmission power.

(R3) For the sake of network planning, the communication device 20 and the like operate communication with the transmission power less than the maximum acceptable transmission power.

(R4) Because the maximum acceptable transmission power value desired by the communication device 20 cannot be acquired, radio transmission with this channel (for example, the frequency band used by the primary system) is given up.

In such cases, a part or whole of the interference quantities distributed to the communication devices 20 may remain. For example, it is assumed in the example of FIG. 1 that the communication device 20₃ cannot acquire a desired maximum transmission power and gives up radio transmission with the frequency band (channel) of the communication system 1. In that case, out of the interference margin $I_{accept}$, at least the interference quantity of the applied interference quantity I3 remains without being used. In the explanations below, the remaining interference quantity is referred to as a residual interference margin. The residual interference margin can also be referred to as a residual interference quantity.

In the prior example, the communication control apparatus calculates the maximum acceptable transmission power of each of the communication devices 20 based on the distributed interference quantity that is distributed to each of the communication devices 20, and notifies the calculated maximum acceptable transmission power to each of the communication devices 20. However, as another approach, the communication device 20 may notify the maximum transmission power desired by itself (referred to as a desired maximum transmission power hereinafter) to the communication control apparatus. In that case, after receiving information on the desired maximum transmission power from the communication device 20, the communication control apparatus calculates an estimated value of the interference that may occur when the desired maximum transmission power is applied to the communication device 20. Then, when the interference estimated value exceeds the distributed interference quantity of the corresponding communication device 20, the communication control apparatus rejects the communication device 20 to make radio transmission with the desired maximum transmission power. At this time, the distributed interference quantity distributed to the rejected communication device 20 may become a part or whole of the residual interference margin (the residual interference quantity).

If the communication device 20 can use the residual interference margin for wireless communication, more effective utilization of the radio frequency resources becomes possible. For example, it is assumed that the communication control apparatus distributes the residual interference margin to a part of the communication devices 20. At this time, the communication device 20 to which the interference quantity is distributed becomes capable of performing radio transmission with higher output. This makes it possible for the communication device 20 to communicate with a terminal device at a distance and to communicate with a greater number of terminal devices at once. In the embodiment, the communication control apparatus adjusts an operation parameter (for example, the maximum transmission power) of the communication device 20 within a range of the residual interference margin so as to enable more effective utilization of the radio frequency resources.

Figure 2:
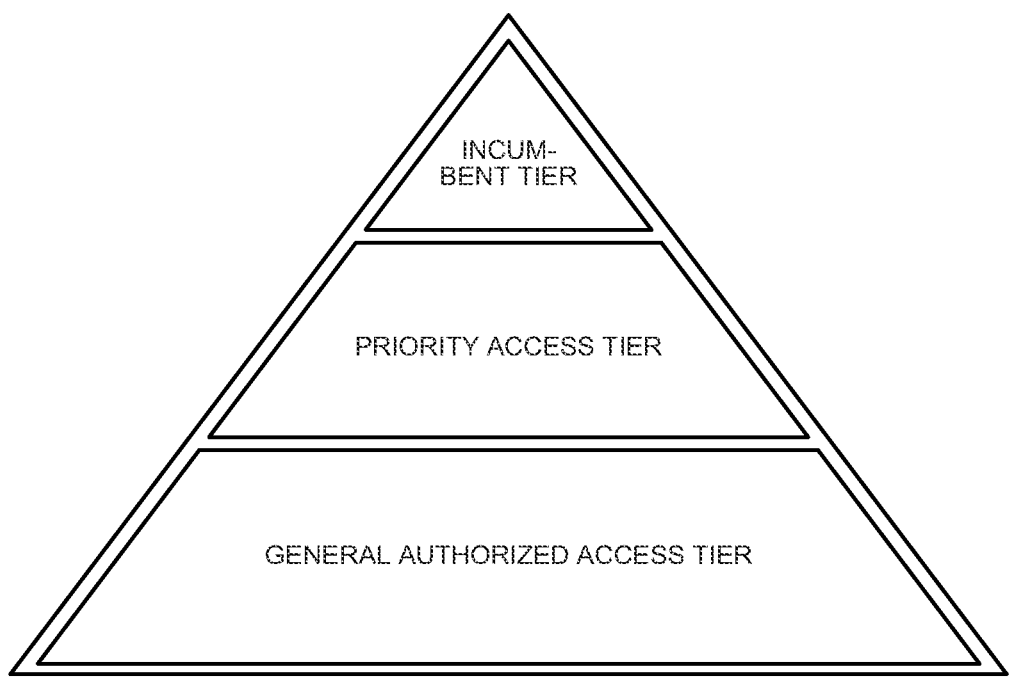
FIG. 2 is an explanatory diagram illustrating a hierarchical structure in CBRS.

In the embodiment, it is assumed that the primary system (the communication system 1) and the secondary system (the communication system 2) are under a frequency sharing environment. A case of CBRS legislated under FCC (Federal Communications Commission) of the United States will be described as an example. FIG. 2 is an explanatory diagram illustrating a hierarchical structure in CBRS. In the CBRS, a hierarchical structure configured with an incumbent tier, a priority access tier, and a general authorized access tier is defined. In this hierarchical structure, the priority access tier is positioned at a higher hierarchy of the general authorized access tier, and the incumbent tier is positioned at a higher hierarchy of the priority access tier. Referring to the CBRS as an example, the system (incumbent system) positioned at the incumbent tier is the primary system, and the systems positioned at the general authorized access tier and the priority access tier are the secondary systems.

Figure 3:
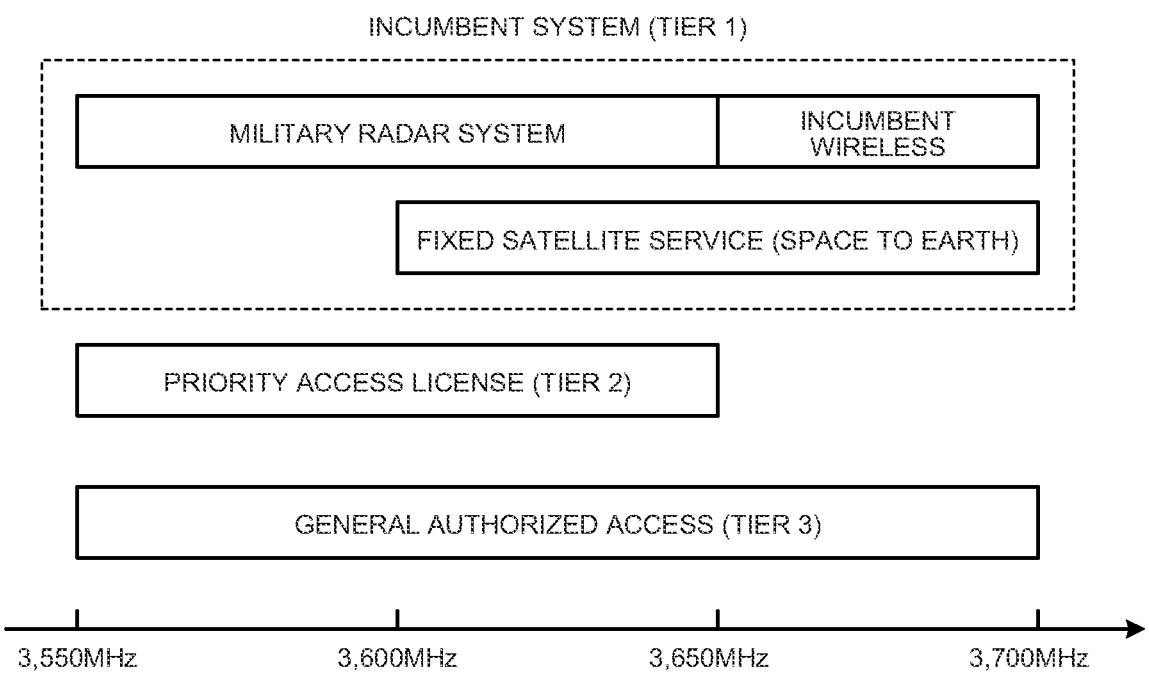
FIG. 3 is an explanatory diagram illustrating bands of CBRS.

FIG. 3 is an explanatory diagram illustrating the bands of CBRS. Referring to the CBRS described above as an example, the primary system is a military radar system, a grandfathered wireless system, or a fixed satellite service (space-to-earth). Note here that the military radar system is a shipborne radar. Furthermore, the secondary system is a wireless system called a CBSD (Citizens Broadband Radio Service Device). There are more priorities in the secondary systems, and Priority Access Licenses (PAL) capable of using shared bands with the license and General Authorized Access (GAA) equivalent to requiring no license are defined. A tier 1 illustrated in FIG. 3 corresponds to the incumbent tier illustrated in FIG. 2. Furthermore, a tier 2 illustrated in FIG. 3 corresponds to the priority access tier illustrated in FIG. 2. Furthermore, a tier 3 illustrated in FIG. 3 corresponds to the general authorized access tier illustrated in FIG. 2.

Note that the primary system (the communication system 1) of the embodiment is not limited to the example illustrated in FIG. 3. Another type of wireless system may be the primary system (the communication system 1). For example, the primary system may be a television broadcasting system such as a DVB-T (Digital Video Broadcasting-Terrestrial) system. Furthermore, the primary system may be a cellular communication system such as LTE (Long Term Evolution) or NR (New Radio). Furthermore, the primary system may be an aeronautical wireless system such as ARNS (Aeronautical Radio Navigation Service). Naturally, the primary system is not limited to the wireless systems described above but may be other types of radio wireless systems.

Furthermore, underutilized radio waves (White Space) used by the communication system 2 is not limited to radio waves of the Federal use band (3.55 to 3.70 GHz). The communication system 2 may use the frequency band different from the Federal use band (3.55 to 3.70 GHz) as the underutilized radio waves. For example, when the primary system (the communication system 1) is a television broadcasting system, the communication system 2 may be a system that uses a TV white space as the underutilized radio wave. Note here that the TV white space is a frequency band that is not utilized by the television broadcasting system among the frequency channels allocated to the television broadcasting system (the primary system). At this time, the TV white space may be a channel that is not used depending on regions.

Furthermore, the relation between the communication system 1 and the communication system 2 is not limited to the frequency sharing relation in which the communication system 1 is the primary system and the communication system 2 is the secondary system. The relation between the communication system 1 and the communication system 2 may be a network coexistence relation between the same or different wireless systems utilizing the same frequency.

2. Configuration of Communication System

Hereinafter, the communication system 2 according to the embodiment of the present disclosure will be described. The communication system 2 is a wireless communication system that performs wireless communication by secondarily utilizing the radio waves used by the communication system 1 (the first wireless system). For example, the communication system 2 is a wireless communication system that dynamically shares the frequency of the underutilized radio waves of the communication system 1. The communication system 2 uses a prescribed radio access technology to provide a wireless service to users or devices owned by the users.

Note here that the communication system 2 may be a cellular communication system such as W-CDMA (Wideband Code Division Multiple Access), cdma2000 (Code Division Multiple Access 2000), LTE, or NR. In the explanations below, "LTE" includes LTE-A (LTE-Advanced), LTE-A Pro (LTE-Advanced Pro), and EUTRA (Evolved Universal Terrestrial Radio Access). Furthermore, "NR" includes NRAT (New Radio Access Technology) and FEUTRA (Further EUTRA). Note that the communication system 2 is not limited to the cellular communication system. For example, the communication system 2 may be another wireless communication system such as a wireless LAN (Local Area Network) system, a television broadcasting system, an aeronautical wireless system, or a space radiocommunication system.

In the embodiment, the communication system 1 is the primary system, and the communication system 2 is the secondary system. As described above, there may be a plurality of communication systems 1 and communication systems 2, respectively. While the communication system 1 in the example of FIG. 1 is configured with a single communication device (the communication device $10_1$ illustrated in FIG. 1), the communication system 1 may be configured with a plurality of communication devices 10. The configuration of the communication device 10 may be the same as the configuration of the communication device 20 or a terminal device 30.

<2-1. Overall Configuration of Communication System>

Figure 4:
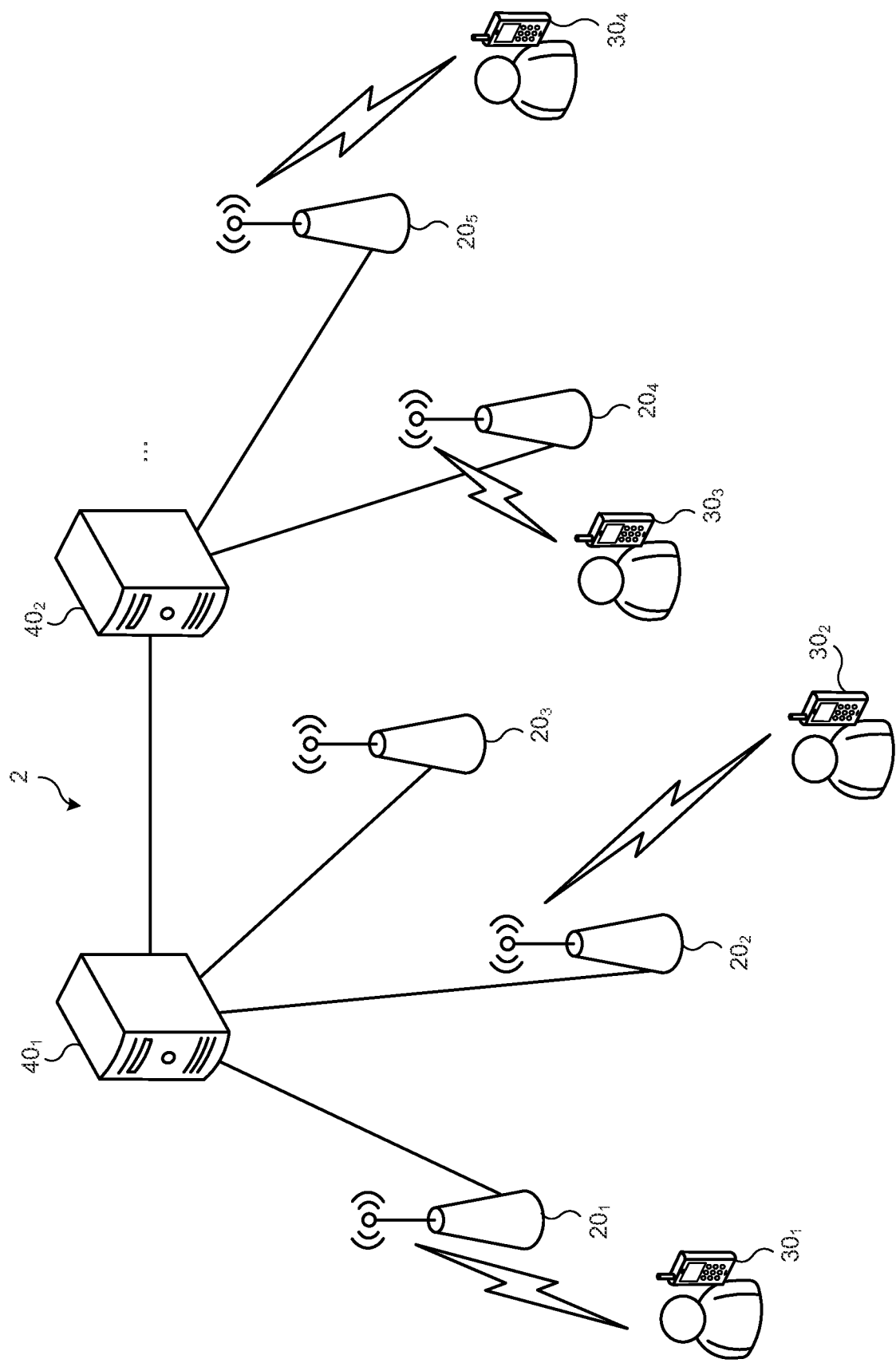
FIG. 4 is a diagram illustrating an example of a configuration of a communication system according to an embodiment of the present disclosure.

FIG. 4 is a diagram illustrating an example of the configuration of the communication system 2 according to the embodiment of the present disclosure. The communication system 2 includes the communication devices 20, the terminal devices 30, and the communication control apparatuses 40. The communication system 2 provides a wireless service to users or the devices owned by the users through cooperative operations of the wireless communication devices configuring the communication system 2. The wireless communication device is a device having a function of wireless communication, and the communication devices 20 and the terminal devices 30 correspond thereto in the example of FIG. 4. Note that the communication control apparatus 40 may have a wireless communication function. In that case, the communication control apparatus 40 can also be considered as the wireless communication device. In the explanations below, the wireless communication device may simply be referred to as a communication device.

The communication system 2 may include a plurality of communication devices 20, terminal devices 30, and communication control apparatuses 40, respectively. In the example of FIG. 4, the communication system 1 includes communication devices $20_1$, $20_2$, $20_3$, $20_4$, $20_5$, and the like as the communication devices 20. Furthermore, the communication system 2 includes terminal devices $30_1$, $30_2$, $30_3$, $30_4$, and the like as the terminal devices 30. Furthermore, the communication system 1 includes communication control apparatuses $40_1$, $40_2$, and the like as the communication control apparatuses 40.

In the explanations below, the communication device (the wireless communication device) may also be called a wireless system. For example, each of the communication device 10 and the communication devices $20_1$ to $20_5$ is a single wireless system. Furthermore, each of the communication devices $30_1$ to $30_4$ is a single wireless system. Note that the wireless system may also be a single system configured with a plurality of wireless communication devices. For example, a system configured with a single or a plurality of communication devices 20 and a single or a plurality of subordinate terminal devices 30 thereof may be considered as a single wireless system. It is also possible to consider the communication system 1 or the communication system 2 as a single wireless system respectively. In the explanations below, a communication system configured with a plurality of wireless communication devices may be referred to as a wireless communication system or simply as a communication system.

The communication device 20 (the second wireless system) is a wireless communication device that performs wireless communication with the terminal device 30 or with another communication device 20. For example, the communication device 20 is a base station (also referred to as a base station device) of a wireless communication system. The radio access technology used by the communication device 20 may be a cellular communication technology or a wireless LAN technology. Naturally, the radio access technology used by the communication device 20 is not limited to those but may be other radio access technologies.

The coverage of the communication device 20 may be as large as a microcell or may be as small as a picocell. Naturally, the coverage of the communication device 20 may also be as extremely small as a femtocell. Furthermore, when the communication device 20 is capable of beamforming, the cell and the service area may be formed by each beam.

The communication device 20 may be installed and operated by a single business operator or may be installed and operated by an individual. Naturally, the principal operator of the installation and operation of the communication device 20 is not limited to those. For example, the communication device 20 may be installed and operated by a plurality of business operators or a plurality of individuals in cooperation. Furthermore, the communication device 20 may be common equipment used by a plurality of business operators or a plurality of individuals. In that case, installation and operation of the equipment may be performed by a third party different from the users.

Note that the concept of the base station includes an access point and a wireless relay station (also referred to as a relay device). Furthermore, the concept of the base station includes not only a structure having a function of a base station but also a device placed at a structure. Examples of the structure may be buildings such as an office building, a house, a steel tower, station facilities, airport facilities, port facilities, and a stadium. Note that the concept of the structure includes not only buildings but also non-building structures such as a tunnel, a bridge, a dam, a fence, and an iron pole, as well as equipment such as a crane, a gate, and a windmill. Furthermore, the concept of the structure includes not only the structure on the ground (land) or in the ground but also structures on the water such as a pier and a mega-float, as well as structures in the water such as ocean observation facilities.

Furthermore, the base station may be a base station (a mobile station) configured to be movable. In this case, the base station (the mobile station) may be a wireless communication device installed in a mobile body or may be a mobile body itself. Furthermore, the mobile body may be a mobile body (for example, a vehicle such as an automobile, a bus, a truck, a train, or a linear motor car) that moves on the ground (land) or may be a mobile body (for example, a subway) that moves underground (for example, in a tunnel). Naturally, the mobile body may be a mobile terminal such as a smartphone. Furthermore, the mobile body may be a mobile body (for example, a ship such as a passenger ship, a cargo ship, or a hovercraft) that moves on the water or may be a mobile body (for example, a submersible vessel such as a submersible, a submarine, and an unmanned submersible) that moves in the water. Furthermore, the mobile body may be a mobile body (for example, an aircraft such as an airplane, an airship, or a drone) or may be a space mobile body (for example, an artificial celestial body such as an artificial satellite, a spaceship, a space station, or a probe) that moves outside the atmosphere.

The terminal device 30 is a communication device having a communication function. The terminal device 30 is a user terminal such as a mobile phone, a smart device (a smartphone or a tablet), a wearable terminal, a PDA (Personal Digital Assistant), or a personal computer, for example. Furthermore, the terminal device 30 may be a device other than a user terminal, such as a machine in a factory, or a sensor placed at a building. For example, the terminal device 30 may be an M2M (Machine to Machine) device or an IoT (Internet of Things) device. Furthermore, the terminal device 30 may be a device including a relay communication function that is represented by D2D (Device to Device). Furthermore, the terminal device 30 may be a device referred to as CPE (Client Premises Equipment) used in a wireless backhaul or the like. Furthermore, the terminal device 30 may be a wireless communication device installed in a mobile body or may be a mobile body itself.

The communication control apparatus 40 is an apparatus that controls wireless communication of the communication device 20. For example, the communication control apparatus 40 is an apparatus that determines an operation parameter used by the communication device 20 and gives an instruction to the communication device 20. At this time, the communication control apparatus 40 may be a network manager that performs integral control of wireless devices within a network. In a case of ETSI EN 303 387 or IEEE 802.19.1-2014, the communication control apparatus 40 may be a control apparatus such as Spectrum Manager/Coexistence Manager that performs radio interference control among the wireless devices. Furthermore, under a frequency sharing environment, a database (a database server, apparatus, system) such as GLDB (Geolocation database) or SAS (Spectrum Access System) can also be the communication control apparatus 40.

Note that there may be a plurality of communication control apparatuses 40 in a single communication system 2.

In that case, the communication control apparatuses 40 exchange mutually managed information on the communication devices 20, and perform allocation of the required frequency as well as calculation of interference control. While the control target of the communication control apparatuses 40 is basically the communication devices 20, the communication control apparatuses 40 may also control the subordinate terminal devices 30 thereof.

Hereinafter, the configuration of each of the devices configuring the communication system 2 will be described in a specific manner.

<2-2. Configuration of Communication Device>

Figure 5:
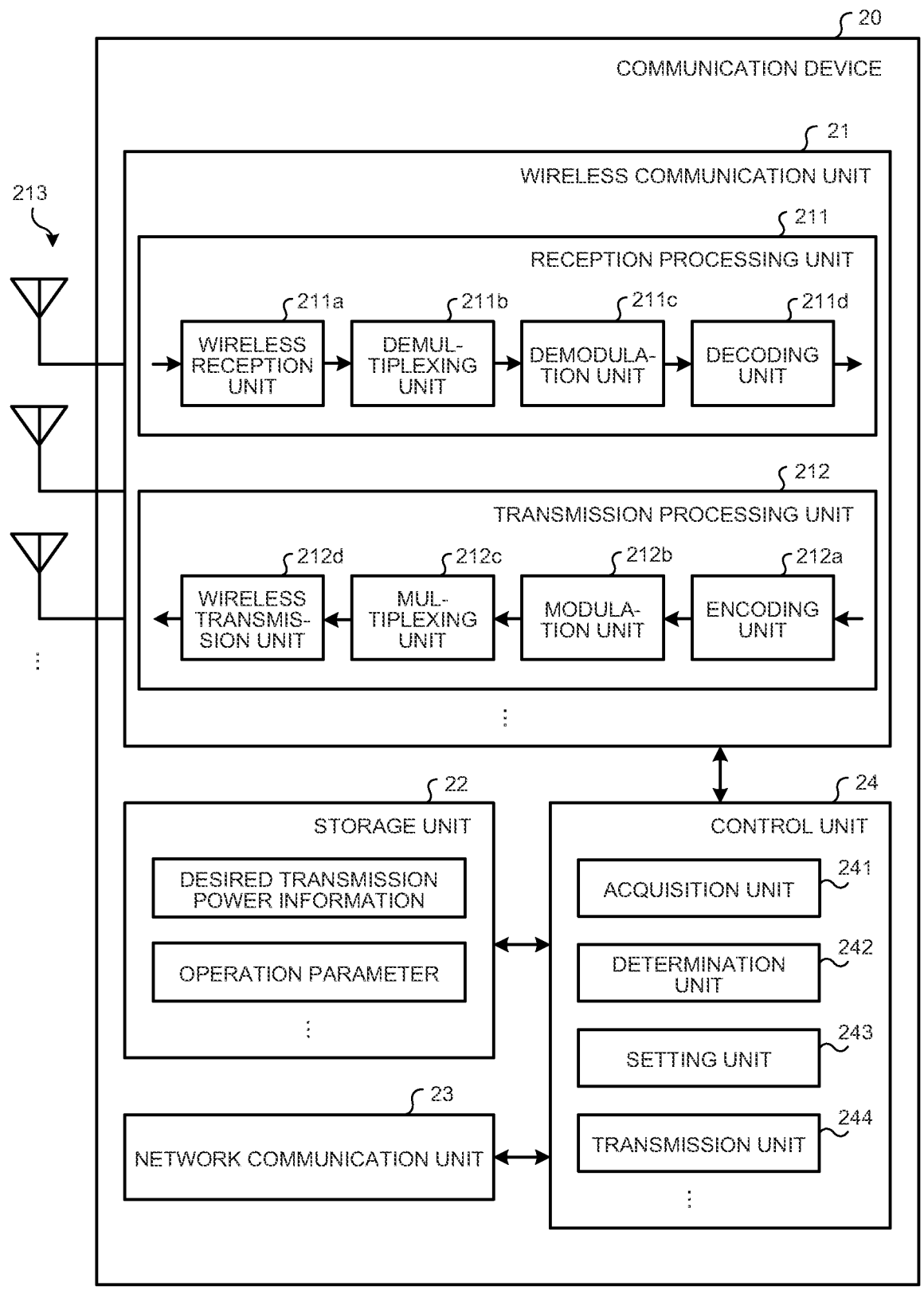
FIG. 5 is a diagram illustrating an example of a configuration of a communication device according to the embodiment of the present disclosure.

First, the configuration of the communication device 20 will be described. FIG. 5 is a diagram illustrating an example of the configuration of the communication device 20 according to the embodiment of the present disclosure. The communication device 20 is a wireless communication device (a wireless system) that performs wireless communication with the terminal device 30 under control of the communication control apparatus 40. For example, the communication device 20 is a base station device (a ground station device) located on the ground. At this time, the communication device 20 may be a base station device placed in a structure on the ground or may be a base station device installed in a mobile body that moves on the ground. More specifically, the communication device 20 may be an antenna placed at a structure such as a building or may be a signal processing device connected to the antenna. Naturally, the communication device 20 may be the structure itself or the mobile body itself. Note that "on the ground" means not only on the ground (land) but also on the ground in a broad sense including underground, on the water, and in the water.

Note that the communication device 20 is not limited to a ground station device. For example, the communication device 20 may be a base station device (a non-ground station) that moves or floats in the air or the space. At this time, the communication device 20 may be an aircraft station device or a satellite station device.

The aircraft station device may be a device loaded on an aircraft or the like or may be an aircraft itself. The concept of the aircraft includes not only heavier-than-air aircrafts such as an airplane and a glider but also lighter-than-air aircrafts such as a balloon and an airship. Furthermore, the concept of the aircraft also includes rotorcrafts such as a helicopter and an autogiro. Note that the aircraft station device (or the aircraft on which the aircraft station device is loaded) may be a manned aircraft or may be an unmanned aircraft such as a drone.

The satellite station device may be a device loaded on a space mobile body such as an artificial satellite or may be the space mobile body itself. The satellite to be the satellite station device may be any one of a Low Earth Orbiting (LEO) satellite, a Medium Earth Orbiting (MEO) satellite, a Geostationary Earth Orbiting (GEO) satellite, and a Highly Elliptical Orbiting (HEO) satellite. Naturally, the satellite station device may be a device loaded on the low earth orbiting satellite, the medium earth orbiting satellite, the geostationary earth orbiting satellite, or the highly elliptical orbiting satellite.

Furthermore, the communication device 20 may be a relay station device. The relay station device may be an aeronautical station or an earth station, for example. The relay station device may be considered a kind of relay devices described above. The aeronautical station is a wireless station placed on the ground or in the mobile body that moves on the ground in order to communicate with the aircraft station device. Furthermore, the earth station is a wireless station located on the earth (including the air) in order to communicate with the satellite station device. The earth station may be a large-scale earth station or may be a small-scale earth station such as VSAT (Very Small Aperture Terminal). Note that the earth station may be a VSAT control earth station (also referred to as a master station or a HUB station) or may be a VSAT earth station (also referred to as a slave station). Furthermore, the earth station may be a wireless station installed in a mobile body that moves on the ground. For example, as the earth station loaded on a ship, there is an Earth Stations on board Vessels (ESV). Furthermore, the earth station may include an aircraft earth station that is placed in an aircraft (including a helicopter) and communicates with the satellite station. Furthermore, the earth station may include an aeronautical earth station that is placed in a mobile body that moves on the ground and communicates with the aircraft earth station via the satellite station. Note that the relay station device may be a portable and mobile wireless station that communicates with the satellite station and the aircraft station.

The communication device 20 includes a wireless communication unit 21, a storage unit 22, a network communication unit 23, and a control unit 24. Note that the configuration illustrated in FIG. 5 is a functional configuration, and the hardware configuration may be different from that. Furthermore, functions of the communication device 20 may be distributed and mounted on a plurality of physically separate apparatuses.

The wireless communication unit 21 is a wireless communication interface that performs wireless communication with other communication devices (for example, the terminal device 30, the communication control apparatus 40, and another communication device 20). The wireless communication unit 21 operates under control of the control unit 24. The wireless communication unit 21 may support a plurality of radio access modes. For example, the wireless communication unit 21 may support both NR and LTE. The wireless communication unit 21 may support other cellular communication modes such as W-CDMA and cdma2000. Furthermore, the wireless communication unit 21 may support a wireless LAN communication mode in addition to the cellular communication mode. Needless to say, the wireless communication unit 21 may only support a single radio access mode.

The wireless communication unit 21 includes a reception processing unit 211, a transmission processing unit 212, and an antenna 213. The wireless communication unit 21 may include a plurality of reception processing units 211, transmission processing units 212, and antennas 213, respectively. When the wireless communication unit 21 supports a plurality of radio access modes, each unit of the wireless communication unit 21 is individually configured for each of the radio access modes. For example, if the communication device 20 supports NR and LTE, the reception processing unit 211 and the transmission processing unit 212 may be configured individually for NR and LTE.

The reception processing unit 211 performs processing of uplink signals received via the antenna 213. The reception processing unit 211 includes a wireless reception unit 211*a*, a demultiplexing unit 211*b*, a demodulation unit 211*c*, and a decoding unit 211*d*.

The wireless reception unit 211*a* performs, for the uplink signals, down-converting, removal of unnecessary frequency components, control of amplification level, quadrature demodulation, conversion to digital signals, removal of guard intervals, extraction of frequency domain signals by fast Fourier transformation, and the like. For example, it is assumed that the radio access mode of the communication device 20 is a cellular communication mode such as LTE. In that case, the demultiplexing unit 211*b* separates uplink channels such as PUSCH (Physical Uplink Shared Channel), PUCCH (Physical Uplink Control Channel), and uplink reference signals from signals output from the wireless reception unit 211*a*. The demodulation unit 211*c* performs demodulation of reception signals by using a modulation method such as BPSK (Binary Phase Shift Keying) or QPSK (Quadrature Phase Shift Keying) for modulation symbols of the uplink channel. The modulation method used by the demodulation unit 211*c* may be 16QAM (Quadrature Amplitude Modulation), 64QAM, or 256QAM. The decoding unit 211*d* performs decoding processing for the demodulated encoded bits of the uplink channel. The decoded uplink data and uplink control information are output to the control unit 24.

The transmission processing unit 212 performs transmission processing of downlink control information and downlink data. The transmission processing unit 212 includes an encoding unit 212*a*, a modulation unit 212*b*, a multiplexing unit 212*c*, and a wireless transmission unit 212*d*.

The encoding unit 212*a* performs encoding of the downlink control information and the downlink data input from the control unit 24 by using an encoding method such as block encoding, convolutional encoding, or turbo encoding. The modulation unit 212*b* modulates the encoded bits output from the encoding unit 212*a* with a prescribed modulation method such as BPSK, QPSK, 16QAM, 64QAM, or 256QAM. The multiplexing unit 212*c* multiplexes modulation symbols and downlink reference signals of each channel and places the resultant signal in a prescribed resource element. The wireless transmission unit 212*d* performs various kinds of signal processing for the signals from the multiplexing unit 212*c*. For example, the wireless transmission unit 212*d* performs processing such as conversion to time domains by a fast Fourier transform, adding guard intervals, generation of digital signals of a base band, conversion to analog signals, quadrature demodulation, up-converting, removal of unnecessary frequency components, and amplification of power. The signals generated by the transmission processing unit 212 are transmitted from the antenna 213.

The storage unit 22 is a data readable and writable storage device such as a DRAM, a SRAM, a flash memory, or a hard disk. The storage unit 22 functions as a storage means of the communication device 20. The storage unit 22 stores therein desired transmission power information, operation parameters, and the like. The desired transmission power information is the information on the transmission power the communication device 20 requests to the communication control apparatus 40, as the information on the transmission power required for transmitting radio waves. The operation parameter is the information regarding the radio transmission operations (for example, setting information) of the communication device 20. For example, the operation parameter is the information on the maximum value of the transmission power (the maximum acceptable transmission power) acceptable to the communication device 20. Naturally, the operation parameter is not limited to the information on the maximum acceptable transmission power.

The network communication unit 23 is a communication interface for communicating with other devices. For example, the network communication unit 23 is a LAN (Local Area network) interface such as (Network Interface Card). The network communication unit 23 may be a USB (Universal Serial Bus) interface configured with a USB host controller, a USB port, and the like. Furthermore, the network communication unit 23 may be a wired interface or a wireless interface. The network communication unit 23 functions as network communication means of the communication device 20. The network communication unit 23 communicates with other devices under control of the control unit 24.

The control unit 24 is a controller that controls each unit of the communication device 20. The control unit 24 is implemented by a processor such as a CPU (Central Processing Unit) or an MPU (Micro Processing Unit). For example, the control unit 24 is implemented by executing various kinds of computer programs stored in the storage device inside the communication device 20 by the processor by having a RAM (Random Access memory) or the like as a working area. Note that the control unit 24 may be implemented by an integrated circuit such as an ASIC (Application Specific Integrated Circuit) or an FPGA (Field Programmable Gate Array). The CPU, the MPU, the ASIC, and the FPGA can all be considered as controllers.

The control unit 24 includes, as illustrated in FIG. 5, an acquisition unit 241, a determination unit 242, a setting unit 243, and a transmission unit 244. Each of the blocks (the acquisition unit 241 to the transmission unit 244) configuring the control unit 24 is a functional block indicating the respective functions of the control unit 24. Those functional blocks may be software blocks or may be hardware blocks. For example, each of the functional blocks described above may be a single software module implemented by software (including a microprogram) or may be a single circuit block on a semiconductor chip (die). Naturally, each of the functional blocks may be a single processor or a single integrated circuit. Any methods may be employed for configuring the functional blocks. Note that the control unit 24 may be configured with a unit of functions different from the functional blocks described above. Operations of each of the blocks (the acquisition unit 241 to the transmission unit 244) configuring the control unit 24 will be described in detail in the section of the communication control processing and the like to be described later.

<2-3. Configuration of Terminal Device>

Figure 6:
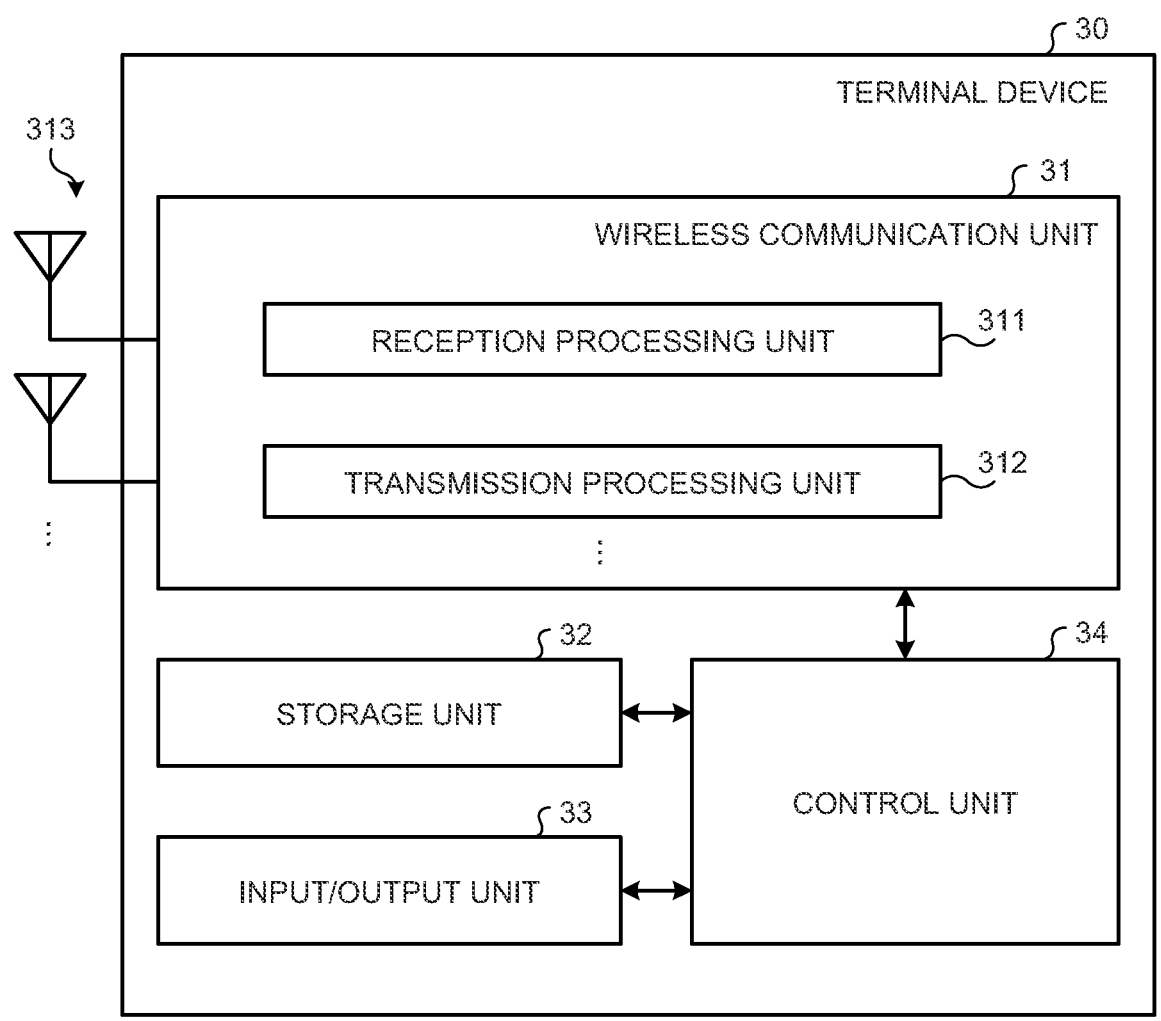
FIG. 6 is a diagram illustrating an example of a configuration of a terminal device according to the embodiment of the present disclosure.

Next, the configuration of the terminal device 30 will be described. FIG. 6 is a diagram illustrating an example of the configuration of the terminal device 30 according to the embodiment of the present disclosure. The terminal device 30 is a communication device that performs wireless communication with the communication device 20 and the communication control apparatus 40. In the embodiment, the concept of the communication device (the wireless communication device) includes not only the base station device but also the terminal device. The communication device can also be referred to as a wireless system.

The terminal device 30 includes a wireless communication unit 31, a storage unit 32, an input/output unit 33, and a control unit 34. Note that the configuration illustrated in FIG. 6 is the functional configuration, and a hardware configuration may be different from that. Furthermore, functions of the terminal device 30 may be distributed and mounted on a plurality of physically separated structures.

The wireless communication unit 31 is a wireless communication interface that performs wireless communication with other communication devices (for example, the communication device 20 and another terminal device 30). The wireless communication unit 31 operates under control of the control unit 34. The wireless communication unit 31 supports a single or a plurality of radio access modes. For example, the wireless communication unit 31 supports both NR and LTE. The wireless communication unit 31 may support other radio access modes such as W-CDMA and cdma2000.

The wireless communication unit 31 includes a reception processing unit 311, a transmission processing unit 312, and an antenna 313. The wireless communication unit 31 may include a plurality of reception processing units 311, transmission processing units 312, and antennas 313, respectively. When the wireless communication unit 31 supports a plurality of radio access modes, each unit of the wireless communication unit 31 is individually configured for each of the radio access modes. For example, the reception processing unit 311 and the transmission processing unit 312 may be configured individually for LTE and NR. The configurations of the reception processing unit 311 and the transmission processing unit 312 are the same as those of the reception processing unit 211 and the transmission processing unit 212 of the communication device 20.

The storage unit 32 is a data readable and writable storage device such as a DRAM, a SRAM, a flash memory, or a hard disk. The storage unit 32 functions as storage means of the terminal device 30.

The input/output unit 33 is a user interface for exchanging information with the user. For example, the input/output unit 33 is an operation device for the user to perform various kinds of operations, such as a keyboard, a mouse, operation keys, or a touch panel. Alternatively, the input/output unit 33 is a display device such as a liquid crystal display or an organic electroluminescence display. The input/output unit 33 may be an acoustic device such as a speaker, or a buzzer. Furthermore, the input/output unit 33 may be a lighting device such as an LED (Light-Emitting Diode) lamp. The input/output unit 33 functions as input/output means (input means, output means, operation means, or notification means) of the terminal device 30.

The control unit 34 is a controller that controls each unit of the terminal device 30. The control unit 34 is implemented by a processor such as a CPU or an MPU. For example, the control unit 34 is implemented by executing various kinds of computer programs stored in the storage device inside the terminal device 30 by the processor by having a RAM or the like as a working area. Note that the control unit 34 may be implemented by an integrated circuit such as an ASIC or an FPGA. The CPU, the MPU, the ASIC, and the FPGA can all be considered as controllers.

<2-4. Configuration of Communication Control Apparatus>

The communication control apparatus 40 is an apparatus that controls wireless communication of the communication device 20. The communication control apparatus 40 may control wireless communication of the terminal device 30 via the communication device 20 or directly. The communication control apparatus 40 is a network manager that performs integral control of the wireless devices within a network, for example. For example, the communication control apparatus 40 is a Spectrum Manager/Coexistence Manager. Furthermore, the communication control apparatus 40 may be a database server such as a GLDB (Geolocation database) or an SAS (Spectrum Access System).

If the communication system 2 is a cellular communication system, the communication control apparatus 40 may be an apparatus that configures a core network. The core network CN is an EPC (Evolved Packet Core) or a 5GC (5G Core network), for example. If the core network is the EPC, the communication control apparatus 40 may be an apparatus having a function as an MME (Mobility Management Entity), for example. Furthermore, if the core network is a 5GC, the communication control apparatus 40 may be an apparatus having a function as an AMF (Access and Mobility Management Function), for example. Note that even if the communication system 2 is a cellular communication system, the communication control apparatus 40 may not necessarily need to be an apparatus that configures a core network. For example, the communication control apparatus 40 may be an apparatus having a function as an RNC (Radio Network Controller).

Note that the communication control apparatus 40 may have a function of a gateway. For example, if the core network is an EPC, the communication control apparatus 40 may be an apparatus that has a function as an S-GW (Serving Gateway) or a P-GW (Packet Data Network Gateway). Furthermore, if the core network is a 5GC, the communication control apparatus 40 may be an apparatus having a function as a UPF (User Plane Function). Note that the communication control apparatus 40 may not necessarily be an apparatus that configures a core network. For example, it is assumed that the core network is a core network of W-CDMA or cdma2000. In that case, the communication control apparatus 40 may be an apparatus that functions as an RNC (Radio Network Controller).

Furthermore, the communication control apparatus 40 may be a system that controls a plurality of secondary systems. In that case, the communication system 2 can be considered as a system including a plurality of secondary systems.

Figure 7:
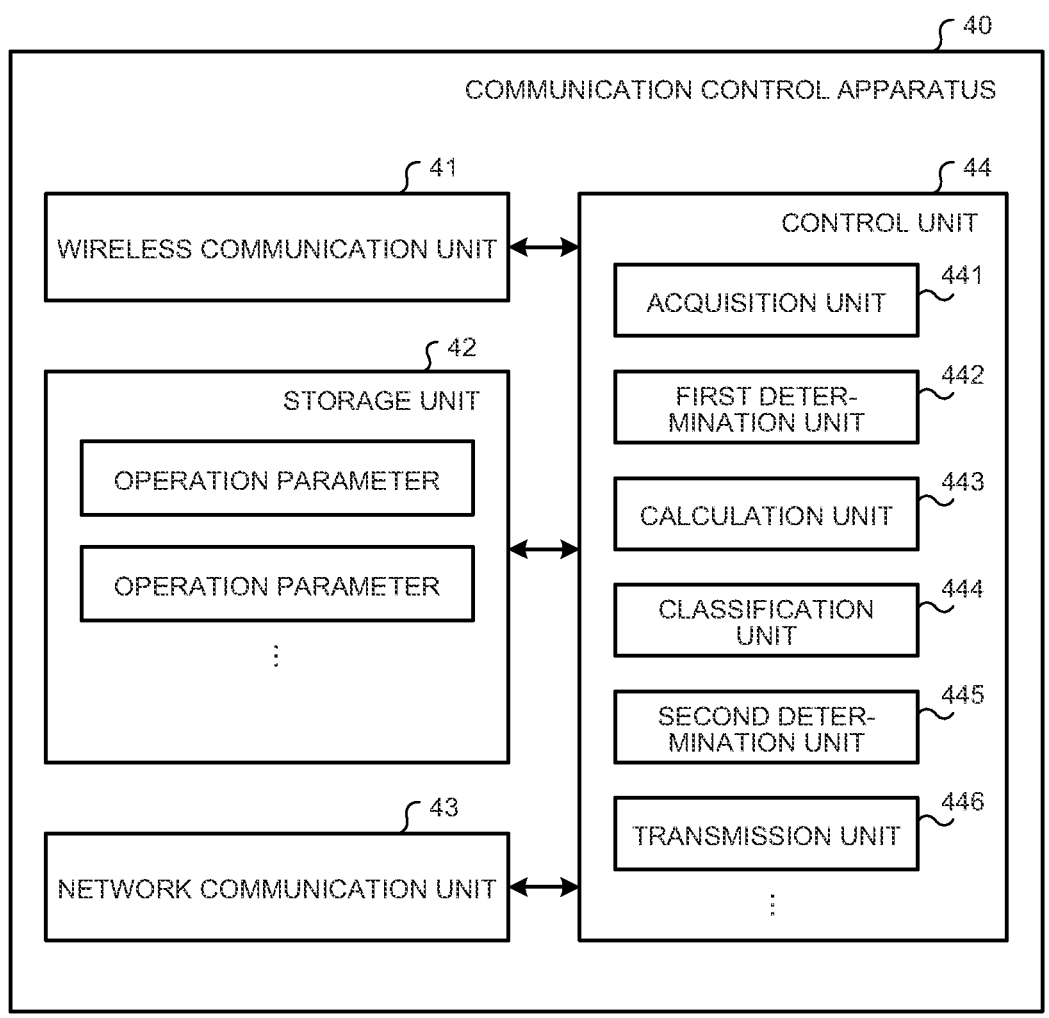
FIG. 7 is a diagram illustrating an example of a configuration of a communication control apparatus according to the embodiment of the present disclosure.

FIG. 7 is a diagram illustrating an example of the configuration of the communication control apparatus 40 according to the embodiment of the present disclosure. The communication control apparatus 40 includes a wireless communication unit 41, a storage unit 42, a network communication unit 43, and a control unit 44. Note that the configuration illustrated in FIG. 7 is the functional configuration, and a hardware configuration may be different from that. Furthermore, functions of the communication control apparatus 40 may be distributed and mounted on a plurality of physically separated structures. For example, the communication control apparatus 40 may be configured with a plurality of server devices.

The wireless communication unit 41 is a wireless communication interface that performs wireless communication with other communication devices (for example, the communication device 20, the terminal device 30, and another communication control apparatus 40). The wireless communication unit 41 operates under control of the control unit 44. The wireless communication unit 31 supports a single or a plurality of radio access modes. For example, the wireless communication unit 31 supports both NR and LTE. The wireless communication unit 31 may support other radio access modes such as W-CDMA and cdma2000. The configuration of the wireless communication unit 41 is the same as that of the wireless communication unit 21 of the communication device 20.

The storage unit 42 is a data readable and writable storage device such as a DRAM, a SRAM, a flash memory, or a hard disk. The storage unit 22 functions as storage means of the communication device 20. The storage unit 22 stores therein operation parameters of each of the communication devices 20 that configure the communication system 2.

The network communication unit 43 is a communication interface for communicating with other devices. The network communication unit 43 may be a network interface or may be a device-connection interface. For example, the network communication unit 43 may be a LAN (Local Area Network) interface such as a NIC (Network Interface Card).

Furthermore, the network communication unit 43 may be a USB (Universal Serial Bus) interface configured with a USB host controller, a USB port, and the like. Furthermore, the network communication unit 43 may be a wired interface or a wireless interface. The network communication unit 43 functions as network communication means of the communication control apparatus 40. The network communication unit 43 communicates with the communication device 20 and the terminal device 30 under control of the control unit 44.

The control unit 44 is a controller that controls each unit of the communication control apparatus 40. The control unit 44 is implemented by a processor such as a CPU or an MPU. For example, the control unit 44 is implemented by executing various kinds of computer programs stored in the storage device inside the communication control apparatus 40 by the processor by having a RAM or the like as a working area. Note that the control unit 44 may be implemented by an integrated circuit such as an ASIC or an FPGA. The CPU, the MPU, the ASIC, and the FPGA can all be considered as controllers.

The control unit 44 includes, as illustrated in FIG. 7, an acquisition unit 441, a first determination unit 442, a calculation unit 443, a classification unit 444, a second determination unit 445, and a transmission unit 446. Each of the blocks (the acquisition unit 441 to the transmission unit 446) configuring the control unit 44 is a functional block indicating the respective functions of the control unit 44. Those functional blocks may be software blocks or may be hardware blocks. For example, each of the functional blocks described above may be a single software module implemented by software (including a microprogram) or may be a single circuit block on a semiconductor chip (die). Naturally, each of the functional blocks may be a single processor or a single integrated circuit. Any method may be employed for configuring the functional blocks. Note that the control unit 44 may be configured with a unit of functions different from the functional blocks described above. Operations of each of the blocks (the acquisition unit 441 to the transmission unit 446) configuring the control unit 44 will be described in detail in the section of the communication control processing and the like to be described later.

3. Residual Interference Margin

As has been described by using FIG. 1, a residual interference margin (a residual interference quantity) may be generated in the communication system 2 (the secondary system) due to various reasons (for example, the reasons (R1) to (R4) described above). The communication control apparatus 40 distributes the residual interference to each of the communication devices 20, and adjusts the maximum acceptable transmission power of the communication devices 20 based on the distributed residual interference margin. Thereby, more effective utilization of radio frequency resources can be achieved. Before describing the processing related to distribution of the residual interference margin according to the embodiment, the residual interference margin will be described. First, an interference model assumed in the embodiment will be described.

<3-1. Interference Model>

Figure 8:
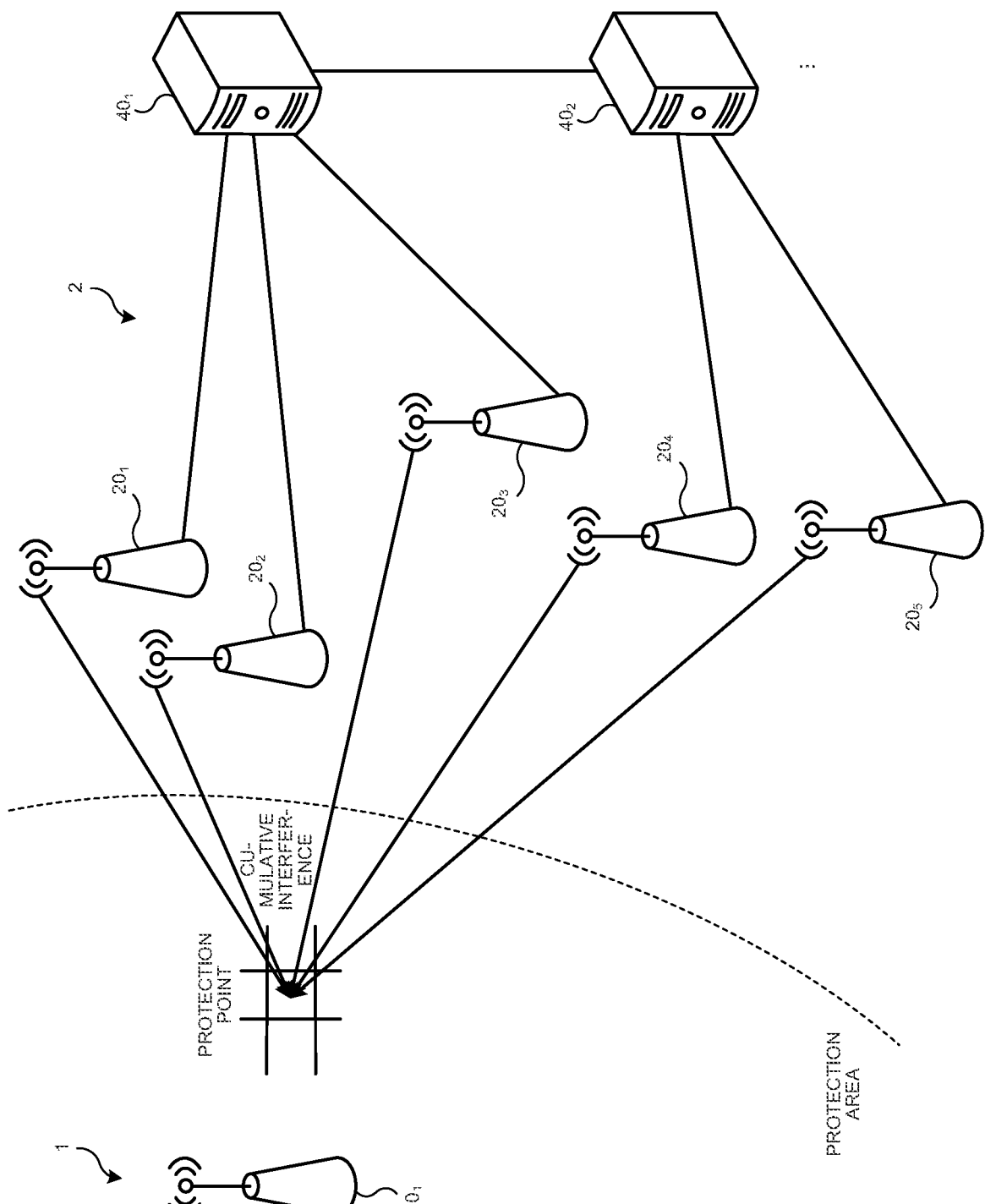
FIG. 8 is an explanatory diagram illustrating an example of an interference model assumed in the embodiment.

FIG. 8 is an explanatory diagram illustrating an example of an interference model assumed in the embodiment. The interference model illustrated in FIG. 8 is applied to a case where the primary system has a service area, for example. In the example of FIG. 8, the communication system 1 (the primary system) is a wireless communication system having a service area. This service area is the protection area of the communication system 1, for example. In the protection area, a plurality of interference calculation reference points (referred to as protection points hereinafter) are set. The protection points are set by the operator of the communication system 1 or a public organization or the like (referred to as an administrator hereinafter) that manages radio waves, for example. For example, the administrator may section the protection area in a lattice form, and have the center of a prescribed lattice as the protection point. Any method can be employed for determining the protection point. The interference margin of each of the protection points is set by the administrator or the like. FIG. 8 illustrates the interference to be given to the protection point by the communication devices 20 configuring the communication system 2 (the secondary system). The communication control apparatus 40 of the communication system 2 controls the transmission power of the communication devices 20 such that the cumulative interference at each of the protection points does not exceed the set interference margin.

Figure 9:
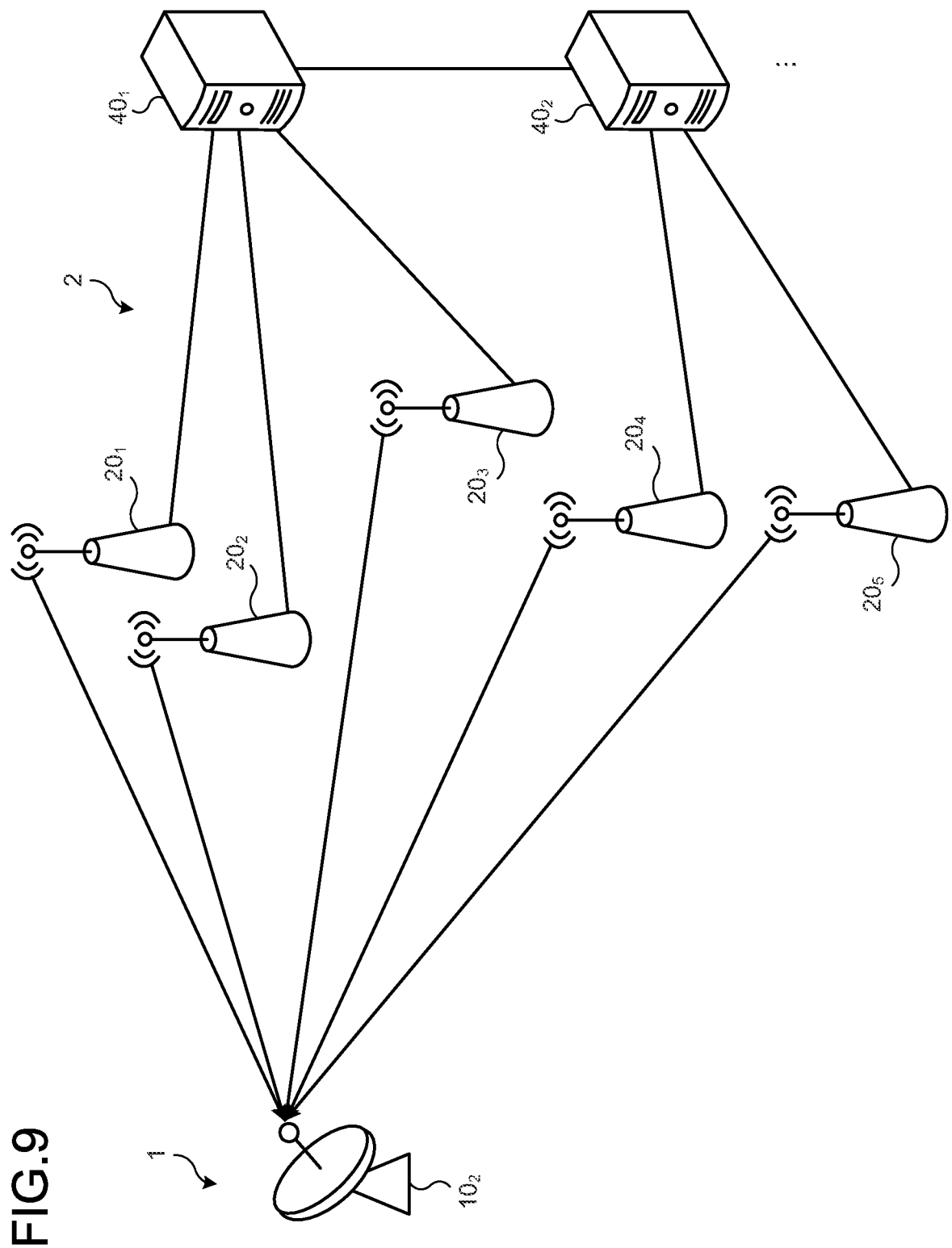
FIG. 9 is an explanatory diagram illustrating another example of the interference model assumed in the embodiment.

FIG. 9 is an explanatory diagram illustrating another example of the interference model assumed in the embodiment. The interference model illustrated in FIG. 9 is applied to a case where the primary system only performs reception, for example. In the example of FIG. 9, the communication system 1 (the primary system) includes a reception antenna as the communication device 102. The communication device 102 is a reception antenna of a satellite ground station, for example. The communication control apparatus 40 of the communication system 2 has the position of the reception antenna as the protection point and controls the transmission power of the communication devices 20 such that the cumulative interference at that point does not exceed the interference margin.

<3-2. Calculation Example of Residual Interference Margin>

Figure 10:
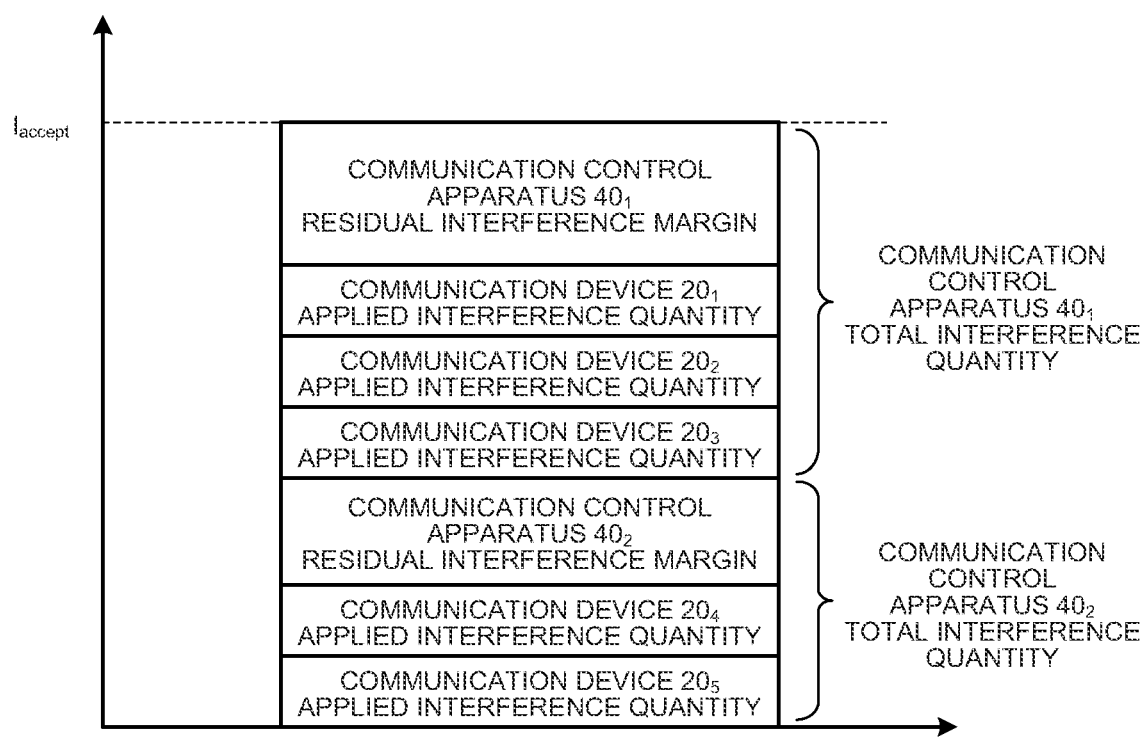
FIG. 10 is an explanatory diagram for describing residual interference margins generated in the communication system.

Next, an example of distribution of the residual interference margin will be described. As has been described by using FIG. 1, a residual interference margin (a residual interference quantity) may be generated in the secondary system. FIG. 10 is an explanatory diagram for describing the residual interference margin generated in the communication system 2. FIG. 10 indicates the total interference quantity set for each of the two communication control apparatuses 40 (the communication control apparatuses $40_1$ and $40_2$). Furthermore, FIG. 10 indicates the interference quantity (applied interference quantity) given to a prescribed protection point of the communication system 1 by the communication devices 20 (the communication devices $20_1$ to $20_5$) under control of the two communication control apparatuses 40. The interference quantity acquired by subtracting the interference quantities of the communication devices 20 from the total interference quantity of each of the two communication control apparatuses 40 is the residual interference margin.

It is to be noted that the interference quantity is set for each protection point and each frequency channel of the wireless communication system (the primary system) as the protection target. When there are a plurality of wireless communication systems having the protection targets, the communication control apparatus 40 considers the interference quantities for several minutes of the wireless communication systems having the protection targets.

Note that there may be a case where information on the interference margin is not directly given to the communication control apparatus 40. In that case, the communication control apparatus 40 may calculate the interference margin based on the information on a Signal-to-Interference-plus-Noise-Ratio(SINR) desired by the protection target (for example, the communication system 1). Alternatively, the communication control apparatus 40 may calculate the interference margin based on the information on a Carrier-to-Interference-plus-Noise-Ratio (CINR). Naturally, the communication control apparatus 40 may calculate the interference margin based on the information on a Signal-to-Interference Ratio (SIR).

For example, a case using SINR for calculating the interference margin will be considered. Assuming that the SINR desired by the protection target is $SINR_{Required(dB)}$, $SINR_{Required(dB)}$ is expressed as formula (1) introduced later. Note here that "S" is the signal power the protection target desires, and "N" is the noise power the protection target receives. $I_{accept}$ is the acceptable interference power. Note that $SINR_{Required(dB)}$ is $SINR_{Required}$ expressed in decibels. That is, a relation of $SINR_{Required(dB)}=10 \log(SINR_{Required})$ holds. Note here that the interference margin (also referred to as acceptable interference power) is defined as $I_{accept(dBm)}$. At this time, $I_{accept(dBm)}$ is derived by formula (2) introduced later. Note that $I_{accept(dBm)}$ is $I_{accept}$ expressed in decibel milliwatts. That is, a relation of $I_{accept(dBm)}=10 \log(I_{accept})$ holds.

$$SINR_{Required(dB)} = 10\log\left(\frac{S}{N + I_{Accept}}\right) \quad (1)$$

$$I_{Accept(dBm)} = 10\log\left(\frac{S - N \cdot SINR_{Required}}{SINR_{Required}}\right) \quad (2)$$

The communication control apparatus 40 can calculate the interference margin $I_{accept(dBm)}$ by acquiring the signal-to-interference-plus-noise-ratio SINR, the desired signal power S, and the noise power N from the communication system 1 and the like. Note that the calculation method of the interference margin is not limited to the example described above. The communication control apparatus 40 may calculate the interference margin by using information other than SINR, CINR, and SIR.

In the explanations hereinafter, in order to promote understanding, it is assumed that the communication system 1 (the primary system) has only one frequency channel and one protection point. Furthermore, it is assumed that the interference margin $I_{accept}$ at the protection point is given in advance to the communication control apparatus 40 by the administrator or the like. Naturally, the interference margin $I_{accept}$ may be acquired by the communication control apparatus 40 from other devices (for example, the devices configuring the communication system 1 or a device of a public organization that manages radio waves). Furthermore, the interference margin $I_{accept}$ may be calculated by the communication control apparatus 40 based on the information supplied from the communication system 1 or the like.

Note that the communication system 1 may have a plurality of protection points and frequency channels. In that case, the communication control apparatus 40 controls the transmission power of the communication devices 20 so as not to exceed the interference margin for all of the protection points and frequency channels. Furthermore, there may also be a case where the communication control apparatus 40 needs to consider the interference to the adjacent channels in addition to the interference to the same channel in regards to the cumulative interference to the primary system. In that case, the following communication control processing may be employed focusing on a single communication control apparatus 40, a single interference calculation reference point (protection point), a prescribed frequency channel of the primary system, and adjacent frequency channels of the prescribed frequency channel.

4. Operations of Communication System

Next, operations of the communication system 2 (the secondary system) will be described. As described above, a residual interference margin (a residual interference quantity) may be generated in the secondary system due to various reasons (for example, the reasons (R1) to (R4) described above). If the residual interference margin can be utilized for radio transmission, more effective utilization of the radio frequency resources becomes possible. In the embodiment, the communication control apparatus 40 achieves more effective utilization of the radio frequency resources by adjusting the maximum acceptable transmission power of the communication devices 20 determined once within a range of the residual interference margin.

<4-1. Communication Control Processing>

Figure 11:
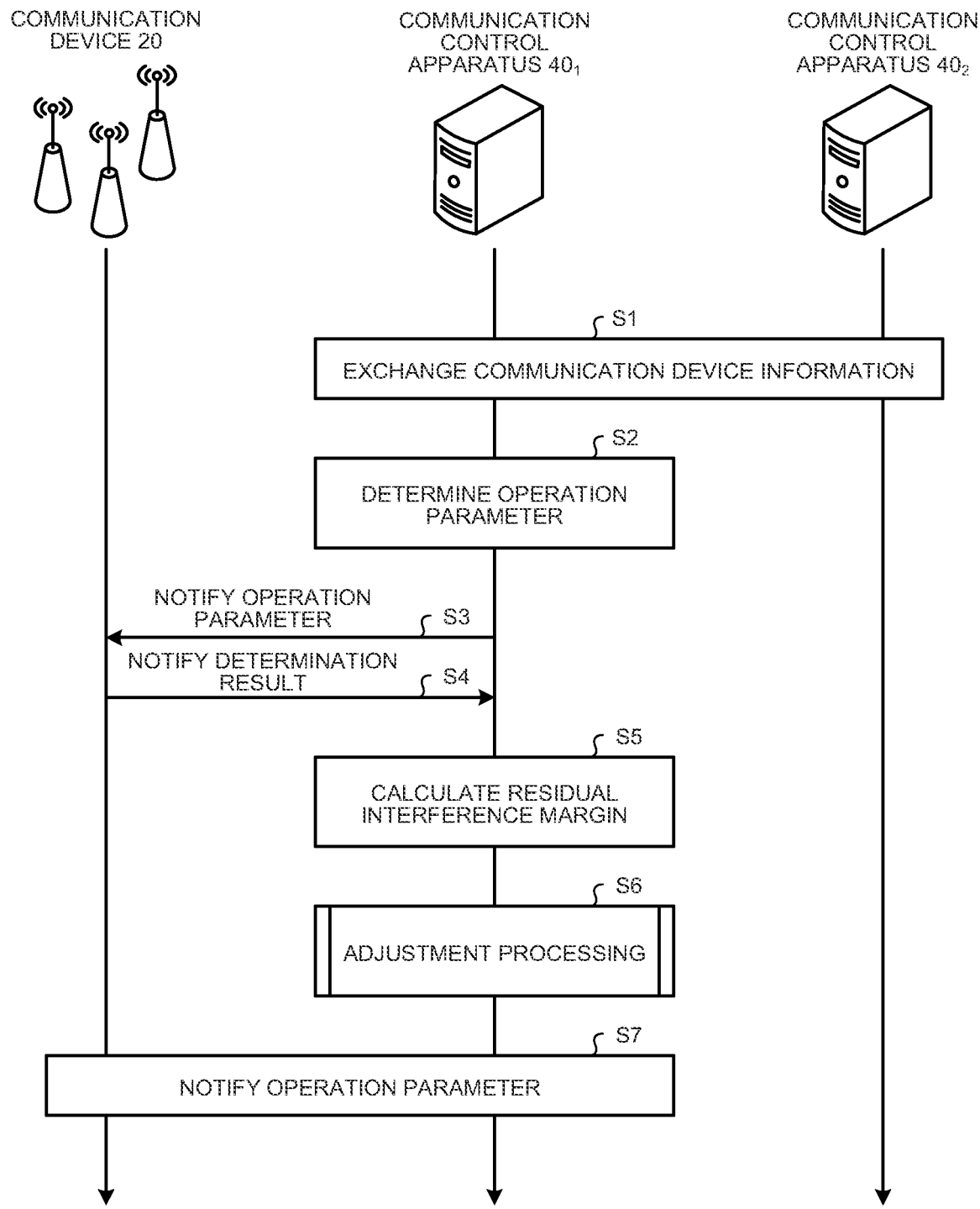
FIG. 11 is a sequence chart illustrating an example of communication control processing according to the embodiment of the present disclosure.

FIG. 11 is a sequence chart illustrating an example of the communication control processing according to the embodiment of the present disclosure. While there are only two communication control apparatuses 40 illustrated in FIG. 11, there may be more than two communication control apparatuses 40. Naturally, there may also be only one communication control apparatus 40. Each of the communication control apparatuses 40 may perform the same processing. For example, each of the communication control apparatuses 40 may determine the operation parameters of all of the communication devices 20 provided in the communication system 2. In that case, each of the communication control apparatuses 40 determines the same operation parameter for a prescribed communication device 20.

In the following explanations, in order to promote understanding, it is assumed that the communication control apparatus $40_1$ is the entity of the processing when it is necessary to specify the individual communication control apparatuses 40. Naturally, another communication control apparatus 40 (for example, the communication control apparatus $40_2$) may also be the entity of the processing. Furthermore, the communication control apparatuses 40 may perform the same processing (for example, the processing described hereinafter) simultaneously. The communication control apparatus 40 may control wireless communication of the terminal device 30 via the communication device 20 or directly. In that case, the communication device 20 described hereinafter may be replaced with the terminal device 30. As described above, the terminal device 30 is also a kind of communication device.

Hereinafter, the communication control processing according to the embodiment of the present disclosure will be described. The communication control processing described hereinafter is executed at each prescribed event (for example, every each specific time or each time a control signal is received from a higher-level device).

First, the acquisition unit 441 of the communication control apparatus $40_1$ exchanges the information on the subordinate communication devices 20 of the other communication control apparatus 40 (step S1). Note here that the information to be exchanged includes (A) information on the active communication device 20 and (B) information on the nonactive communication device 20 presented below. At this time, the following information of A1 to A6 may be included in (A) information on the active communication device 20. Furthermore, the following information of B1 to A4 may be included in (B) information on the nonactive communication device 20.

(A) Information on Active Communication Device 20
A1. Various kinds of ID information allocated to communication device 20
A2. Information indicating position of communication device 20
A3. Information on frequency used by communication device 20
A4. Information on transmission power being used at frequency indicated in A3
A5. Maximum transmission power (hardware-dependent) applicable to communication device 20
A6. Transmission power class, device category
(B) Information on Nonactive Communication Device 20
B1. Various kinds of ID information allocated to communication device 20
B2. Information indicating position of communication device 20
B3. Maximum transmission power (hardware-dependent) applicable to communication device 20
B4. Transmission power class, device category Note here that the active communication device 20 means the communication device 20 whose maximum acceptable transmission power has already been calculated by the communication control apparatus 40, or the communication device 20 that has already received a radio transmission permission form the communication control apparatus 40. The other communication devices 20 that are simply registered with the communication control apparatus 40 are nonactive communication devices 20.

Note that the information acquired by the acquisition unit 441 may be the information regarding the hardware configuration of the communication device 20. In the explanations below, the information regarding the hardware configuration of the communication device 20 is referred to as hardware configuration information. The hardware configuration information may be the information on "maximum transmission power applicable to communication device 20" indicated in A5 and B4. Furthermore, the information acquired by the acquisition unit 441 may be the information on the transmission power desired by the communication device 20 (for example, the transmission power requested to the communication control apparatus 40 from the communication device 20). The transmission power desired by the communication device 20 is referred to as a desired transmission power. The acquisition unit 441 saves the acquired information in the storage unit 42.

Thereafter, the first determination unit 442 of the communication control apparatus 40$_1$ performs a calculation related to protection of the primary system while considering the subordinate communication devices 20 of the other communication control apparatus 40 (for example, the communication control apparatus 40$_2$). Specifically, the first determination unit 442 determines the operation parameter (the first operation parameter) for each of the communication devices 20 so as to satisfy the protection standard of the primary system (for example, such that the cumulative interference becomes the acceptable interference power $I_{accept}$ or less) (step S2). The operation parameter is the setting the communication device 20 uses for radio transmission, and it is the information regarding output of radio transmission, for example. For example, the operation parameter is the information on the maximum transmission power (the maximum acceptable transmission power) acceptable to the communication device 20.

Then, the transmission unit 446 of the communication control apparatus 40$_1$ notifies the operation parameter (the first parameter) to each of the communication devices 20 (step S3). The acquisition unit 241 of the communication device 20 acquires the operation parameter from the communication control apparatus 40$_1$. Furthermore, the determination unit 242 of the communication device 20 determines whether the operation parameter can be applied to itself. For example, the determination unit 242 determines whether the maximum acceptable transmission power included in the operation parameter is the minimum required power for transmission of radio waves or more. When the notified maximum acceptable transmission power is the power required by itself or more, the determination unit 242 may determine the residual power (a difference between the maximum acceptable transmission power and the required power).

Then, the transmission unit 244 of the communication device 20 notifies the determination result to the communication control apparatus 40$_1$ (step S4). The acquisition unit 441 of the communication control apparatus 40$_1$ acquires the determination result from each of the communication devices 20. The acquisition unit 441 may acquire the hardware configuration information and the information on the desired transmission power from each of the communication devices 20. The acquisition unit 441 saves the acquired information in the storage unit 42.

Upon acquiring the determination result, the calculation unit 443 of the communication control apparatus 40$_1$ calculates the residual interference margin (the residual interference quantity) based on the operation parameter determined at step S2 and the determination result acquired at step S4 (step S5). The residual interference margin is the interference quantity that is allowed to be additionally allocated to the subordinate communication device 20 (the second wireless system) of the communication control apparatus 40$_1$.

Then, the second determination unit 445 of the communication control apparatus 40$_1$ executes adjustment processing for adjusting the operation parameters of the communication devices 20 (step S6). Specifically, the second determination unit 445 adjusts the maximum acceptable transmission power determined at step S2 based on the residual interference margin calculated at step S5. The second determination unit 445 adjusts the maximum acceptable transmission power of each of the communication devices 20 within a range of the residual interference margin calculated at step S5 while using the maximum acceptable transmission power determined at step S2.

The adjusted maximum acceptable transmission power can be expressed by formula (3) introduced later. Formula (3) expresses the adjusted maximum acceptable transmission power regarding the i-th communication device 20. Note that "i" is the index of the communication device 20. The i-th communication device 20 is the communication device 20$_1$ when "i" is 1, and is the communication device 20$_2$ when "i" is 2. Formula (4) indicates that the cumulative interference of the communication devices 20 does not exceed the interference margin (the interference margin) of a primary system p (for example, the communication system 1). The primary system p is the p-th primary system. The second determination unit 445 adjusts the maximum acceptable transmission power of each of the communication devices 20 so as to satisfy the condition indicated in formula (4) introduced later.

$$P_{Tx,i}^{Cx}(f)_{(dBm)} = P_{MaxTx,i}(f)_{(dBm)} + \alpha_i(f)_{(dB)} \quad (3)$$

$$I_{Accept,p}(f)_{(dBm)} \geq \quad (4)$$

$$10\log_{10}\left(\sum_{i=0}^{N_{Tx}(f)-1}\left[10^{\frac{P_{MaxTx,i}(f)_{(dBm)}+\alpha_i(f)_{(dB)}-L_{p-i(dB)}+G_{Ant(dB)}}{10}}\right]\right)$$

Note that the parameters in formula (3) and formula (4) are as follows.

f: Frequency i: Index of communication device 20

$P_{MaxTx,i}(f)_{(dBm)}$: Unadjusted maximum acceptable transmission power at frequency f regarding i-th communication device 20

$\alpha_i(f)_{(db)}$: Adjustment quantity (adjustment value) of maximum acceptable transmission power at frequency f regarding i-th communication device 20

$P_{Tx,i}^{Cx}(f)_{(dBm)}$: Adjusted maximum acceptable transmission power at frequency f regarding i-th communication device 20

$I_{accept,p}(f)_{(dBm)}$: Interference margin of primary system p at frequency f $N_{Tx}(f)$: Number of communication devices 20 at frequency f $L_{p-i(dB)}$: Propagation loss between primary system p and i-th communication device 20

$G_{Ant(dB)}$: Antenna gain of primary system p

Note that the parameters with (dB) or (dBm) added thereto means that those are expressed in terms of logarithms. Specifically, when (dB) is added to the parameter, it means that the parameter is expressed in decibels. Furthermore, when (dBm) is added to the parameter, it means that the parameter is expressed in decibel milliwatts. Note that the parameter to which neither (dB) nor (dBm) is added means that it is expressed in terms of antilogarithms (linear). For example, if the transmission power of the antilogarithm is "x" (mW), it is expressed as "$x_{(dBm)}$" in terms of logarithms (expressed in decibel milliwatts). That is, $x_{(dBm)}=10 \log(x)$. Note that the calculations mentioned in the embodiment can be replaced with calculations of the same meaning. Expressions in terms of logarithms (expressed in decibels, expressed in decibel milliwatts) can be replaced with an expression in terms of antilogarithms as appropriate.

The second determination unit 445 calculates the adjusted maximum acceptable transmission power $P_{Tx,i}^{Cx}(f)_{(dBm)}$ based on the residual interference margin calculated at step S5. Assuming that the residual interference margin is expressed by $I_{Remained}(f)_{(dBm)}$, the residual interference margin $I_{Remained}(f)_{(dBm)}$ can be expressed by formula (5) introduced later.

$$I_{Remained}(f)_{(dBm)} = \quad (5)$$

$$10\log_{10}\left(I_{Accept,p}(f) - \sum_{i=0}^{N_{Tx}(f)-1}\left[10^{\frac{P_{MaxTx,i}(f)_{(dBm)}-L_{p-i(dB)}+G_{Ant(dB)}}{10}}\right]\right)$$

On the right side of formula (5), calculated is a difference between the acceptable interference quantity of the primary system p and the cumulative applied interference power that may be given to the primary system from the communication devices 20. This difference is the residual interference margin. When calculating the adjusted maximum acceptable transmission power, in the second determination unit 445, attention is paid such that the change quantity of the cumulative applied interference power caused by the adjustment quantity $\alpha_i(f)_{(dB)}$ mentioned in formula (3) does not exceed the residual interference margin $I_{Remained}(f)_{(dB)}$. Therefore, for the second determination unit 445, formula (6) introduced later needs to be considered as a constraint condition.

$$I_{Remained}(f)_{(dBm)} \geq 10\log_{10}\left(\sum_{i=0}^{N_{Tx}(f)-1}\left[10^{\frac{P_{MaxTx,i}(f)_{(dBm)}+\alpha_i(f)_{(dB)}-L_{p-i(dB)}+G_{Ant(dB)}}{10}} - 10^{\frac{P_{MaxTx,i}(f)_{(dBm)}-L_{p-i(dB)}+G_{Ant(dB)}}{10}}\right]\right)$$

$$= 10\log_{10}\left(\sum_{i=0}^{N_{Tx}(f)-1}\left[\left(10^{\frac{\alpha_i(f)_{(dB)}}{10}} - 1\right) \cdot 10^{\frac{P_{MaxTx,i}(f)_{(dBm)}-L_{p-i(dB)}+G_{Ant(dB)}}{10}}\right]\right) \quad (6)$$

Inside the summation ($\Sigma$) on the right side of formula (6) indicates the difference between the applied interference quantity of the adjusted transmission power and the applied interference quantity of the unadjusted transmission power in each of the communication devices 20. The second determination unit 445 determines the adjusted maximum acceptable transmission power $P_{Tx,i}^{Cx}(f)_{(dBm)}$ or the adjustment quantity $\alpha_i(f)_{(dB)}$ of each of the communication devices 20 while the constraint condition indicated in formula (6) is in consideration. The adjustment quantity can also be referred to as the adjustment value.

Then, the transmission unit 446 notifies the adjusted maximum acceptable transmission power to the communication device 20 as the operation parameter (the second operation parameter) (step S7). At this time, the transmission unit 446 may notify a combination of the adjusted maximum acceptable transmission power $P_{Tx,i}^{Cx}(f)_{(dBm)}$ and the adjustment quantity $\alpha_i(f)_{(dB)}$ to the i-th communication device 20 as the operation parameter (the second operation parameter). Alternatively, the transmission unit 446 may notify both the adjusted maximum acceptable transmission power $P_{Tx,i}^{Cx}(f)_{(dBm)}$ and the unadjusted maximum acceptable transmission power $P_{Tx,i}^{Cx}(f)_{(dBm)}$ as the operation parameter (the second operation parameter). Those parameters notified by the transmission unit 446 may be expressed in terms of antilogarithms or may be expressed in terms of logarithms. Naturally, the parameters may be expressed in other forms. The forms for expressing the parameters may be changed freely as long as it can be notified to the communication device 20 eventually.

The acquisition unit 441 of the communication device 20 acquires the operation parameter (the second operation parameter) from the communication control apparatus 40₁. Then, the setting unit 243 of the communication device 20 sets the operation parameter acquired by the acquisition unit 441. Then, the transmission unit 244 of the communication device 20 transmits radio waves based on the set operation parameter. For example, the i-th communication device 20 outputs radio waves so as not to exceed the adjusted maximum acceptable transmission power $P_{Tx,i}^{Cx}(f)_{(dBm)}$ After completing notification of the operation parameter, the control unit 44 of the communication control apparatus 40₁ ends the communication control processing.

<4-2. Example of Adjustment Processing>

If the optimum $\alpha_i(f)_{(dB)}$ based on a certain metric is acquired according to the constraint condition described above, the calculation amount becomes extremely large depending on the number of the communication devices 20. Thus, in the embodiment, the adjustment processing at step S6 described above is performed in consideration of mutual interference groups. Note here that the mutual interference group is the group of the communication devices 20 interfering with each other.

Figure 12:
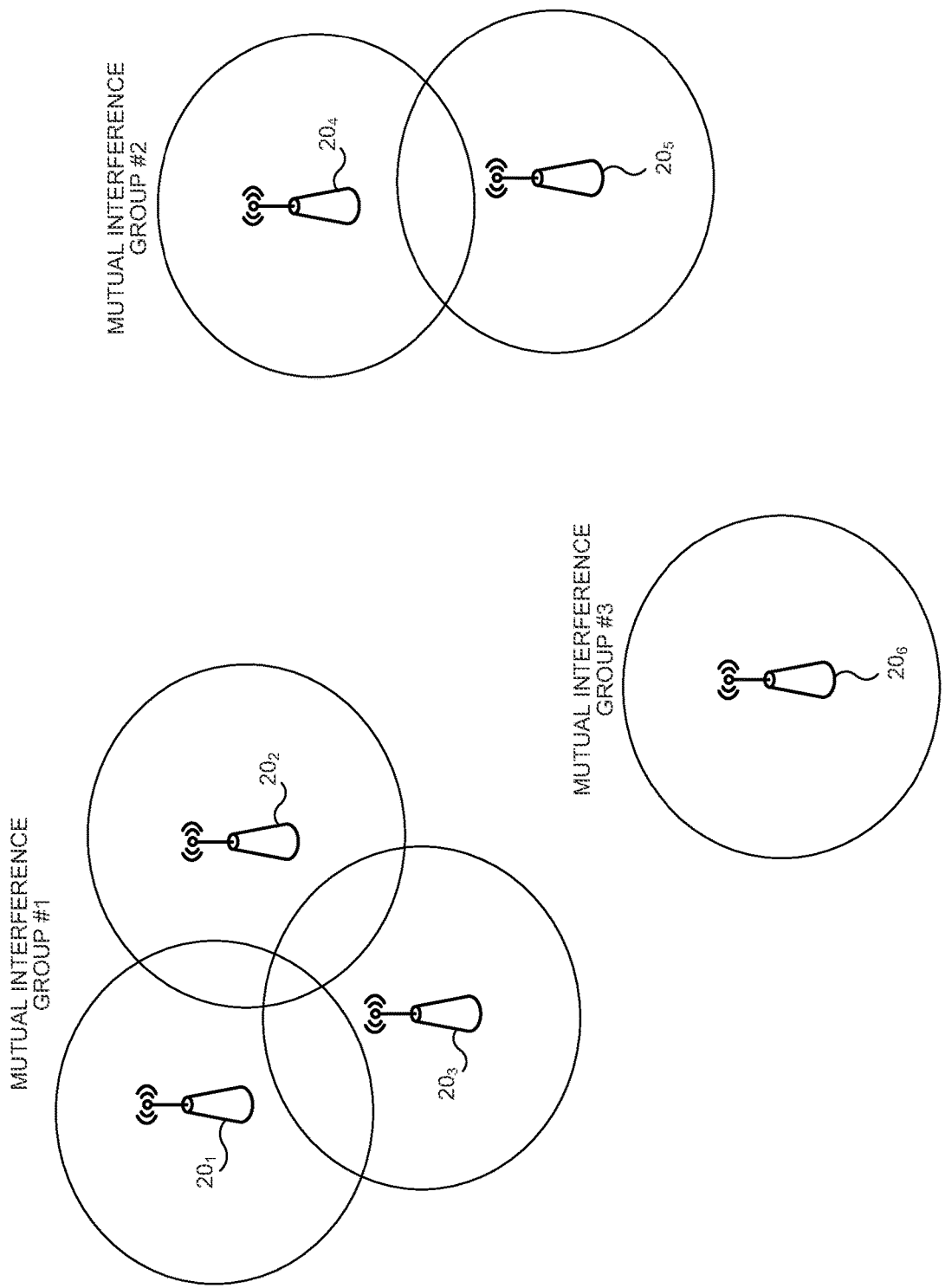
FIG. 12 is an explanatory diagram for describing mutual interference groups.

FIG. 12 is an explanatory diagram for describing the mutual interference groups. In the example of FIG. 12, the communication devices 20₁ to 20₃ form a mutual interference group #1, the communication devices 20₄ and 20₅ form a mutual interference group #2, and a communication device 20₆ forms a mutual interference group #3. Like the mutual interference group #3, there may be only a single communication device 20 belonging to a single mutual interference group.

In the example of FIG. 12, the communication devices 20 within the mutual interference group are in a positional relation where the range (coverage) covering the communication overlaps with each other. Thus, when a prescribed communication device 20 within the mutual interference group outputs a radio wave, it interferes with communication of the other communication devices 20 within that mutual interference group. For example, it is assumed that the terminal device 30 is located at the position where a cell formed by the communication device 20₁ and a cell formed by the communication device 20₂ overlap, and that the communication device 20₁ is communicating with the terminal device 30. At this time, if the communication device 20₂ outputs a radio wave, the output may interfere with the communication between the communication device 20₁ and the terminal device 30.

Figure 13:
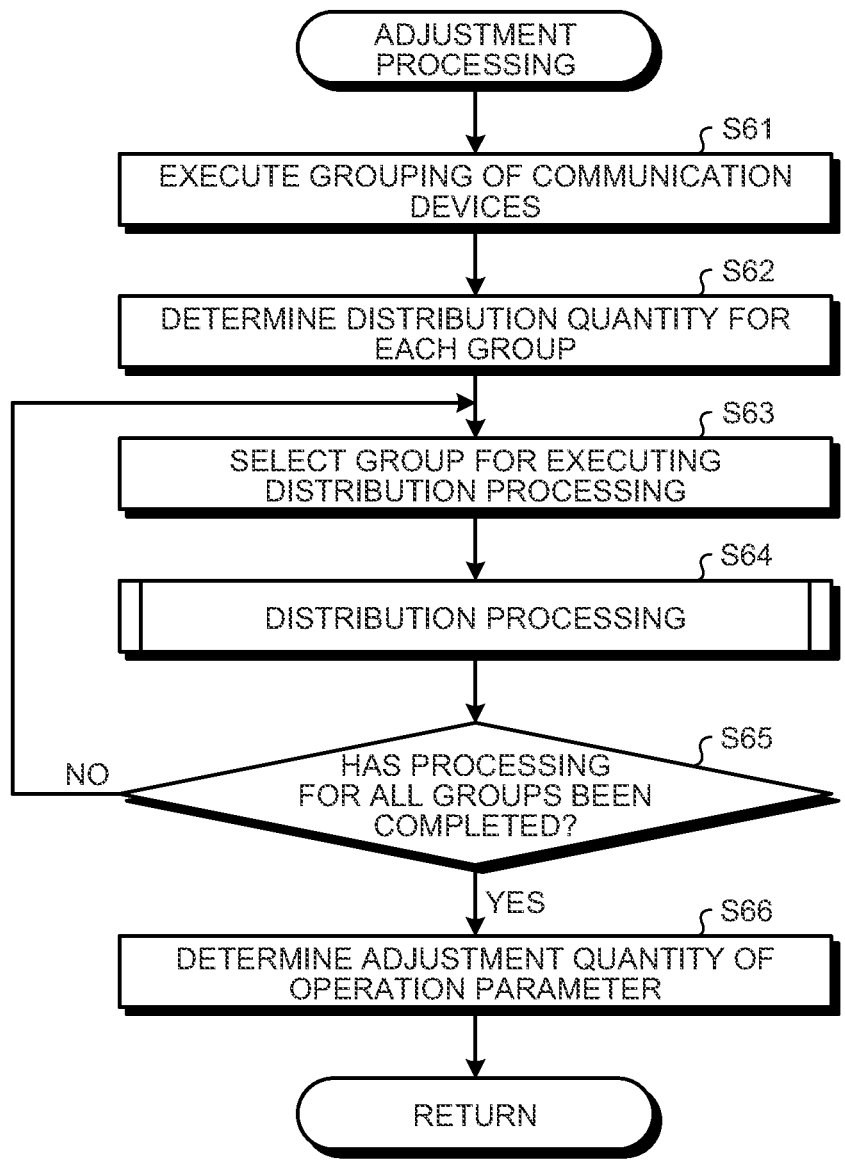
FIG. 13 is a flowchart illustrating an example of adjustment processing according to the embodiment of the present disclosure.

In the embodiment, by calculating the interference between the communication devices in a unit of mutual interference group to acquire $\alpha_i(f)_{(dB)}$, an increase in the calculation amount is prevented. FIG. 13 is a flowchart illustrating an example of the adjustment processing according to the embodiment of the present disclosure.

Note that grouping at step S61 may be executed by any of the communication device 20, the network manager handling the communication devices 20, and the communication control apparatus 40. When an entity other than the communication control apparatus 40 executes grouping, it is desirable to notify the grouping information to the communication control apparatus 40 from that entity. In the explanations below, it is assumed that the communication control apparatus 40₁ executes grouping.

Hereinafter, an example of the adjustment processing will be described by referring to the flowchart of FIG. 13. The adjustment processing described hereinafter is executed at step S6 of the communication control processing illustrated in FIG. 11, for example.

First, the classification unit 444 of the communication control apparatus 40₁ executes grouping of the communication devices 20 (step S61). Note here that the communication devices 20 to be the target of grouping is a group of communication devices that may give cumulative applied interference power to a single primary system. The classification unit 444 calculates, estimates, or derives the mutual interference relation among the communication devices 20 to be the target, and handles the communication devices in the mutual interference relation as a single "mutual interference group". Note here that the classification unit 444 may determine whether the communication devices are in a mutual interference relation (whether the communication devices mutually interfere) according to an overlap relation thereof by using the coverages of the communication devices, for example. Furthermore, the classification unit 444 may determine whether the communication devices are in a mutual interference relation based on class information that is "Network Geometry Class" employed in IEEE Std 802.19.1-2014, IEEE Std 802.19.1a-2017.

In the example of FIG. 12, the classification unit 444 determines the overlap relation based on the coverages of the communication devices 20, and performs grouping based on the determination result. The coverage itself can be determined with various metrics. For example, the classification unit 444 may determine the maximum area where the reception power level of the radio waves transmitted by the communication device 20 satisfies a certain value as the coverage of the communication device 20. Alternatively, the classification unit 444 may determine, as the coverage of the communication device 20, a circular area with a radius of certain distance from the position of the communication device 20 as the center. Naturally, the classification unit 444 may determine the service area of the communication device 20 as the coverage of the communication device 20. The classification unit 444 is capable of determining the coverage of the communication device 20 by various methods.

The coverage of the communication device 20 may be calculated and determined by the communication control apparatus 40 itself, or information notified from another device may directly be determined as the coverage of the communication device 20. For example, the communication control apparatus 40 may acquire the information on the coverage calculated by the communication device 20 itself from this communication device 20 (or the network manager). Alternatively, the communication control apparatus 40 may acquire the information on the coverage written in advance in software of the communication device 20 from the communication device 20 (or the network manager). Note that the information on the coverage of the communication device 20 may be notified to the communication control apparatus 40 by the user (for example, a mobile network operator) of the communication device 20 by using API or dedicated web form provided by the communication control apparatus 40.

Furthermore, the classification unit 444 may perform grouping based on the class information on the communication devices 20. The class information (transmission power class information) is the information regarding the transmission power classes defined in the communication devices 20. As for the transmission power classes, various standards thereof can be employed. For example, in C.F.R Part 96 Citizens Broadband Radio Service (CBRS) as FCC regulations, two kinds of classes such as category A and category B are defined as the transmission power classes of the communication devices corresponding to a base station/access point. Category A is a category in which the maximum EIRP is 30 dBm/10 MHz, and category B is a category in which the maximum EIRP is 47 dBm/10 MHz. For example, if the class information on the communication devices 20 is the information according to this standard, the classification unit 444 may classify the communication devices 20 of category B as a single mutual interference group.

Furthermore, along with the coverage information described above, the classification unit 444 may classify the communication devices 20 of category B with a part or whole of each coverage overlapped with each other as a single mutual interference group. Naturally, as for the transmission power classes, not only the example of CBRS but also classes of various standards can be employed.

Other than that, when the communication devices 20 form a single cell represented by a case of DAS (Distributed Antenna System), the classification unit 444 can also determine the communication devices 20 configuring a single cell as a single "mutual interference group".

Note that the classification unit 444 may not necessarily need to classify the communication devices 20 into a mutual interference group. The classification unit 444 may classify the communication devices 20 into a plurality of groups according to other standards. The "groups" mentioned in the explanations below may not necessarily be the mutual interference groups. Note that the "group" mentioned in the explanations below can be replaced with a "set". For example, "unadjustable group" may be replaced with "non-adjustable set", and "adjustment unnecessary group" is replaced with "adjustment unnecessary set".

Note that the classification unit 444 does not necessarily need to classify the communication devices 20 included in the communication system 2 into a plurality of groups. The classification unit 444 may classify the communication devices 20 into a single group.

Subsequently, the second determination unit 445 of the communication control apparatus $40_1$ determines a distribution quantity $I_{Remained,m}(f)_{(dBm)}$ of the residual interference margin allocated to each of the groups determined at step S61 (step S62). Note here that "m" is the index of the group. That is, the distribution quantity $I_{Remained,m}(f)_{(dBm)}$ indicates the distribution quantity $I_{Remained,m}(f)_{(dBm)}$ for the group m (a prescribed set).

Here, the second determination unit 445 determines the distribution quantity $I_{Remained,m}(f)_{(dB)}$ so as to satisfy the constraint conditions indicated in formula (7) and formula (8) introduced later. Formula (7) indicates that the distribution quantity $I_{Remained,m}(f)$ should not exceed the residual interference margin $I_{Remained}(f)$. Furthermore, formula (7) indicates that the interference quantity distributed to a single group (a prescribed set) may be the entire residual interference margin or a part thereof. Furthermore, formula (8) indicates that the total distribution quantity distributed to each group should not exceed the residual interference margin $I_{Remained}(f)_{(dBm)}$. Note that $N_{Group}$ in formula (8) indicates the number of groups.

$$0 \le I_{Remained,m}(f) \le I_{Remained}(f) \quad (7)$$

$$I_{Remained}(f)_{(dBm)} \ge 10\log\left(\sum_{m=0}^{N_{Group}-1} 10^{\frac{I_{Remained,m}(f)_{(dBm)}}{10}}\right) \quad (8)$$

For determining the distribution quantity of the residual interference margin, standards indicated in the following (D1) to (D3) can be applied.

(D1) In a case where all of the communication devices 20 belonging to a group cannot adjust the operation parameters, the second determination unit 445 does not distribute the residual interference margin to that group (referred to as a non-adjustable group hereinafter). For example, all of the communication devices 20 belonging to the group cannot apply the residual interference margin to the transmission power due to hardware constraints of the devices, the second determination unit 445 does not distribute the residual interference margin to that group.

Specifically, the second determination unit 445 determines, from a single or a plurality of groups classified at step S61, the non-adjustable group in which all of the belonging communication devices 20 cannot adjust the operation parameter. Furthermore, the second determination unit 445 does not allocate the residual interference margin to the non-adjustable group, but allocates a part or whole of the residual interference margin to another group (an adjustable group) that includes at least one communication device 20 that can adjust the operation parameter. At this time, the acquisition unit 441 may acquire hardware configuration information on each of the communication devices 20 from the storage unit 42. Furthermore, the second determination unit 445 may determine, as the non-adjustable group, the group in which all of the belonging communication devices 20 cannot adjust the operation parameter due to the hardware configuration.

(D2) In a case where all of the communication devices 20 belonging to the group do not need to adjust the operation parameter, the second determination unit 445 does not distribute the residual interference margin to that group (referred to as the adjustment unnecessary group hereinafter). For example, in a case where all of the communication devices 20 belonging to the group can apply a desired transmission power regardless of the constraints due to the protection of the primary system, the second determination unit 445 does not distribute the residual interference margin to that group.

Specifically, the second determination unit 445 determines, from a single or a plurality of groups classified at step S61, the adjustment unnecessary group in which all of the belonging communication devices 20 do not need to adjust the operation parameter. Furthermore, the second determination unit 445 does not allocate the residual interference margin to the adjustment unnecessary group, but allocates a part or whole of the residual interference margin to another group (an adjustable group) that includes at least one communication device 20 that can adjust the operation parameter. At this time, the acquisition unit 441 may acquire information on the desired transmission power of each of the communication devices 20 from the storage unit 42. Furthermore, the second determination unit 445 may determine, as the adjustment unnecessary group, the group in which all of the belonging communication devices 20 satisfy the desired transmission power.

(D3) The second determination unit 445 distributes the residual interference margin based on the number of the communication devices 20 included in each of the groups. For example, the distribution quantity $I_{Remained,m}(f)_{(dBm)}$ for the group m can be calculated as in formula (9) introduced later. Note here that $N_{m,CommDevice}$ is the number of the communication devices 20 within the group m. Furthermore, $N_{Total,CommDevice}$ is the total number of the communication devices 20.

$$I_{Remained,m}(f)_{(dBm)} = 10\log\left(\frac{N_{m,CommDevice}}{N_{Total,CommDevice}} \cdot 10^{\frac{I_{Remained}(f)_{(dBm)}}{10}}\right) \quad (9)$$

Note that the number of the communication devices 20 within the group m, $N_{m,CommDevice}$, may be the number excluding "the communication device 20 that cannot adjust the operation parameter" and/or "the communication device 20 that is unnecessary to adjust the operation parameter". Furthermore, the total number of the communication devices 20, $N_{Total,CommDevice}$, may be the number excluding "the communication device 20 that cannot adjust the operation parameter" and/or "the communication device 20 that is unnecessary to adjust the operation parameter". At this time, "the communication device 20 that cannot adjust the operation parameter" is the communication device 20 that cannot apply the residual interference margin to the transmission power due to hardware constraints, for example. Furthermore, "the communication device 20 that is unnecessary to adjust the operation parameter" is the communication device 20 in which the desired transmission power is already satisfied, for example.

Subsequently, the second determination unit 445 selects, from a plurality of groups, the group to which the distribution processing has not been executed (step S63). Note that the second determination unit 445 may exclude, before executing step S63, the non-adjustable group and/or the adjustment unnecessary group from the groups to be the selection target. Then, the second determination unit 445 executes the distribution processing for the selected group (a prescribed set) (step S64). The distribution processing is the processing for determining the distribution quantity of the residual interference margin for each of the communication devices 20 within the group (within the prescribed set) based on the distribution quantity $I_{Remained,m\,(f)(dBm)}$ of the residual interference margin determined at step S62.

For determining the distribution quantity of the residual interference margin, various standards can be employed. For example, it is assumed that the distribution quantity $I_{Remained,m(f)(dBm)}$ allocated to a prescribed group (a prescribed set) is equally distributed to each of the communication devices 20 within the prescribed group (within the prescribed set). In that case, the distribution quantity to the communication device 20 is calculated as in formula (10) introduced later. Note here that $I_{Remained,m,n\,(f)(dBm)}$ is the distribution quantity to the n-th communication device 20 within the group m.

$$I_{Remained,m,n}(f)_{(dBm)} = 10\log\left(\frac{1}{N_{m,CommDevice}} \cdot 10^{\frac{I_{Remained,m}(f)_{(dBm)}}{10}}\right) = \quad (10)$$

$$I_{Remained,m}(f)_{(dBm)} - 10\log(N_{m,CommDevice})$$

Subsequently, the second determination unit 445 determines whether the processing is completed for all of the groups (step S65). When the processing is not completed (step S65: No), the second determination unit 445 returns the processing to step S63. When the processing is completed (step S65: Yes), the second determination unit 445 determines the adjustment quantity of the operation parameter determined at step S2 (step S66).

For example, it is assumed that the operation parameter determined at step S2 is the maximum acceptable transmission power $P_{Tx,n(f)(dBm)}$. At this time, the second determination unit 445 determines the adjustment quantity $\alpha_n(f)_{(dB)}$ of the maximum acceptable transmission power as in formula (11) introduced later. The meanings of each of the parameters are the same as those indicated in formula (3), formula (4), and the like. Note that "n" in formula (11) means the index of the communication device 20 as in formula (3) and formula (4).

$$\alpha_n(f)_{(dB)} = \quad (11)$$

$$10\log\left(10^{\frac{I_{Remained,m,n}(f)_{(dBm)}+L_{p-n(dB)}-G_{Ant(dB)}}{10}} - 10^{\frac{P_{MaxTx,n}(f)_{(dBm)}}{10}}\right)$$

After the adjustment quantity is determined, the control unit 44 of the communication control apparatus $40_1$ returns to the communication control processing illustrated in FIG. 11.

<4-3. Example of Distribution Processing>

The adjustment processing described by using FIG. 12 and FIG. 13 can be easily applied to the case where, for example, the communication devices 20 within the group employ the same radio access mode and a common interference avoidance technology can be used. For example, it is assumed that the communication devices 20 can use the technology such as LBT (Listen-Before-Talk). In that case, the communication device 20 does not perform transmission if the radio waves of another communication device 20 are detected. Thus, from the viewpoint of the communication control apparatus 40, it is possible to increase the transmission power of the communication device 20 without much regard to the interference within the group. Therefore, the adjustment processing described above can be applied easily.

Therefore, the communication control apparatus 40 acquires the information regarding the radio access mode of the communication devices 20, and sequentially performs distribution so as to satisfy the required characteristic based thereupon. An example of the required characteristic may be the transmission power. For example, it is assumed first that the maximum acceptable transmission power $P_{MaxTx,i(f)(dBm)}$ less than the desired transmission power $P_{desired,(f)(dBm)}$ of the i-th communication device 20 is set (or determined) for the sake of protecting the primary system. In such a case, the communication control apparatus 40 can increase the maximum acceptable transmission power up to the initial desired transmission power or close to that by using the distribution quantity $I_{Remained,m(f)(dBm)}$ of the residual interference margin. Therefore, it is possible to rank such communication devices 20 in the descending order of deviation and distribute the residual interference margin to the ranked communication devices 20 in that order. In that case, algorithms as follows may be employed.

Figure 14:
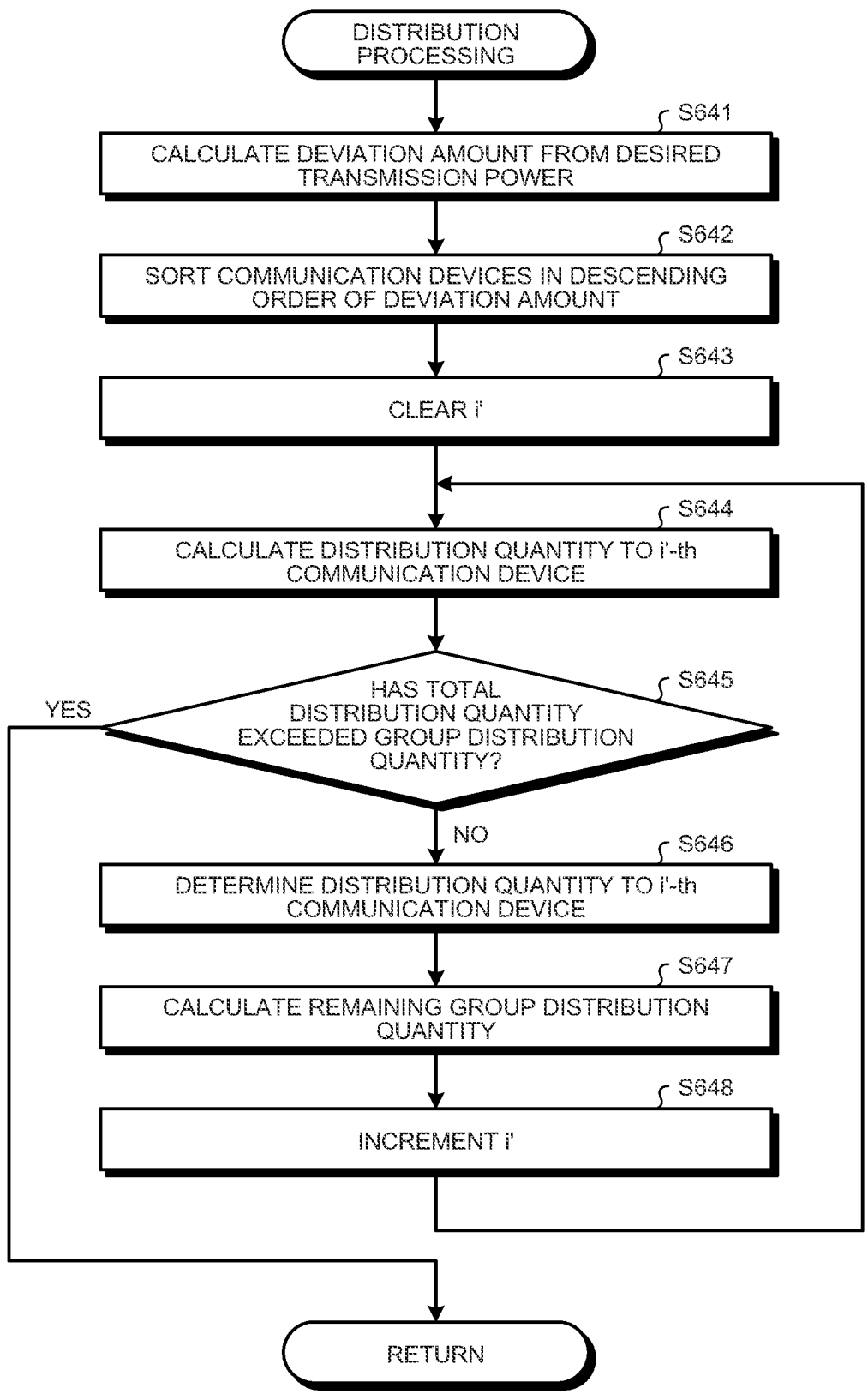
FIG. 14 is a flowchart illustrating an example of distribution processing according to the embodiment of the present disclosure.

FIG. 14 is a flowchart illustrating an example of the distribution processing according to the embodiment of the present disclosure. Hereinafter, the example of the distribution processing will be described by referring to the flowchart of FIG. 14. The distribution processing described hereinafter is executed at step S64 of the adjustment processing illustrated in FIG. 13, for example.

First, the second determination unit 445 of the communication control apparatus $40_1$ calculates the deviation amount from the desired transmission power for each of the communication devices 20 in the group (step S641). Note here that $\Delta P_i = P_{MaxTx,i}(f) P_{desired,i}$ (f), where the deviation amount of the i-th communication device 20 is $\Delta P_i$. $P_{MaxTx,i}$ (f) is the unadjusted maximum acceptable transmission power regarding the i-th communication device 20. Furthermore, $P_{desired,i}(f)$ is the desired transmission power of the i-th communication device 20.

Subsequently, the second determination unit 445 sorts the communication devices 20 in the order (the descending order) of the deviation amount (step S642). Hereinafter, the index of the sorted communication devices 20 is defined as i'. Furthermore, the second determination unit 445 clears the variable i' (step S643), that is, i'=0.

Then, the second determination unit 445 calculates the distribution quantity to the i'-th communication device 20 (step S644). Note here that $I_{increase,i'}(f)_{(dBm)} = \Delta P_{i'(dBm)} - L_{p-i'(dB)} + G_{Ant(dB)}$, where the distribution quantity of the i'-th communication device 20 is $I_{increase,i'}(f)_{(dBm)}$. Note that $\Delta P_{i'(dBm)}$ is the deviation amount of the i'-th communication device 20, and it is the term corresponding to $\alpha i'(f)_{(dB)}$. $L_{p-i'(dB)}$ is the propagation loss between the primary system and the i'-th communication device 20. $G_{Ant(dB)}$ is the antenna gain of the primary system.

Then, the second determination unit 445 determines whether the total distribution has exceeded the distribution quantity to the group (step S645). For example, the second determination unit 445 determines whether $I_{Remained,m}(f)_{(dBm)} - I_{increase,i'}(f)_{(dBm)} \geq 0$ is satisfied. In this step, $I_{Remained,m}(f)_{(dBm)}$ means the remaining of the distribution quantity of the residual interference margin allocated to the group m.

When the total distribution has exceeded the distribution quantity to the group (step S645: Yes), the second determination unit 445 returns to the adjustment processing illustrated in FIG. 13.

When the total distribution has not exceeded the distribution quantity to the group (step S645: No), the second determination unit 445 determines the distribution quantity of the i'-th communication device 20 (step S646). The second determination unit 445 may determine the distribution quantity $I_{increase,i'}(f)_{(dBm)}$ calculated at step S644 directly as the distribution quantity of the i'-th communication device 20. Note that the second determination unit 445 may determine the smaller quantity than the distribution quantity calculated at step S644 as the distribution quantity of the i'-th communication device 20 based on the information (for example, the hardware configuration information or the information on the desired transmission power) of the i'-th communication device 20.

Subsequently, the second determination unit 445 calculates the remaining distribution quantity of the residual interference margin allocated to the group (step S647). For example, it is assumed that, at step S646, the distribution quantity $I_{increase,i'}(f)_{(dBm)}$ calculated at step S644 is determined directly as the distribution quantity of the i'-th communication device 20. At this time, the second determination unit 445 performs calculation to obtain $I_{Remained,m}(f)_{(dBm)} = I_{Remained,m}(f)_{(dBm)} - I_{increase,i'}(f)_{(dBm)}$. $I_{Remained,m}(f)_{(dBm)}$ on the left side is the remaining distribution quantity.

Subsequently, the second determination unit 445 increments i' (step S648). That is, the second determination unit 445 obtains i'=i'+1. Then, the second determination unit 445 returns the processing to step S644.

In this processing, the transmission power is assumed as the desired characteristic. However, another desired characteristic (for example, Shannon capacity or magnitude of the interference quantities among the communication devices) may instead be used as the desired characteristic. Note, however, that even in a case using those, the distribution quantity may be determined successively in a descending order of the deviation in terms of the desired characteristic. For example, it is assumed that the magnitude of the interference quantities among the communication devices 20 is used instead as the desired characteristic. In that case, the second determination unit 445 distributes the residual interference margin to the other communication devices 20 so as to increase the applied interference quantity to the communication device 20 in which a difference between the acceptable interference quantity thereof and an interference aggregation (cumulative applied interference power) for the communication device 20 calculated with the unadjusted transmission power is large. Then, the second determination unit 445 adjusts the transmission power value of each of the communication devices 20 based on the distribution result.

<4-4. Example of Determination Processing>

The second determination unit 445 may take the distribution quantity of the residual interference margin determined based on the desired transmission power of the communication device 20 as the upper limit of the distribution quantity. At this time, the second determination unit 445 may determine the transmission power of each of the communication devices 20 as follows.

Figure 15:
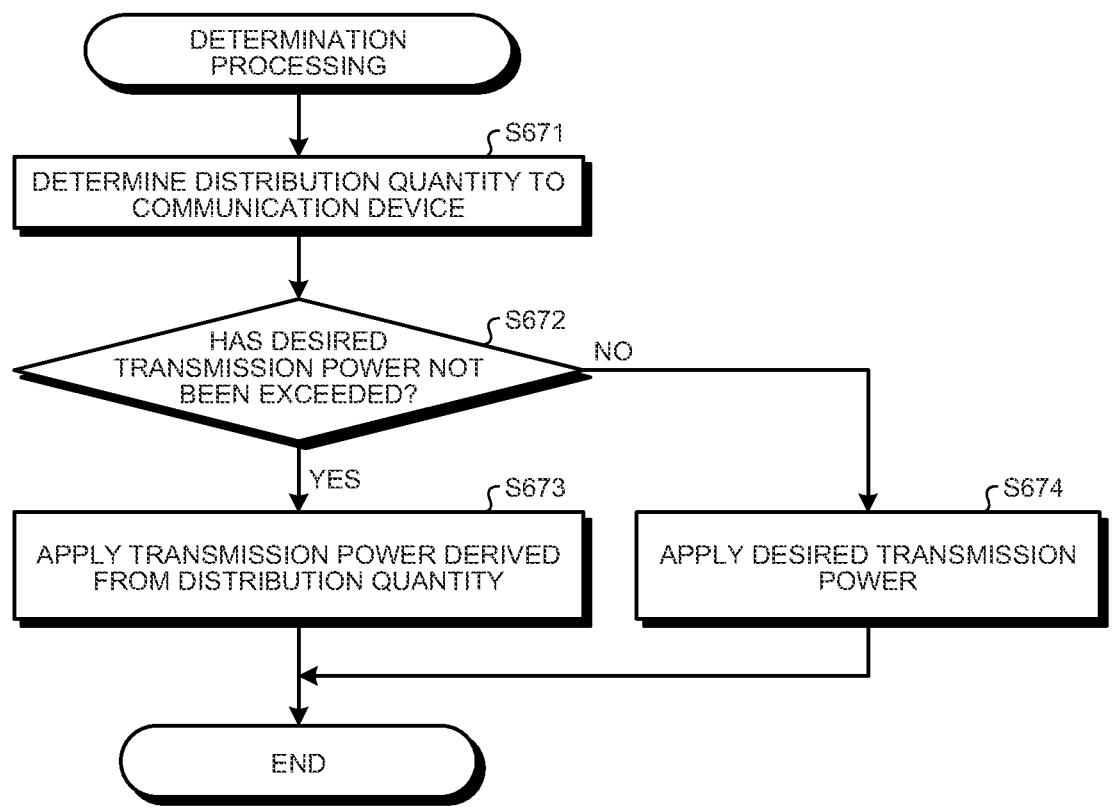
FIG. 15 is a flowchart illustrating an example of determination processing according to the embodiment of the present disclosure.

FIG. 15 is a flowchart illustrating an example of the determination processing according to the embodiment of the present disclosure. Hereinafter, the example of the determination processing will be described by referring to the flowchart of FIG. 15. The determination processing described hereinafter is executed at step S6 of the communication control processing illustrated in FIG. 11, for example.

First, the second determination unit 445 determines the distribution quantity to the communication device 20 based on a certain desired characteristic (step S671). Then, the second determination unit 445 determines whether the transmission power (for example, the maximum acceptable transmission power) derived from the distribution quantity determined at step S671 has exceeded the desired transmission power of the communication device 20 (step S672).

When not exceeded (step S672: Yes), the second determination unit 445 determines the distribution quantity determined at step S671 as the distribution quantity applied to the corresponding communication device 20. Then, the second determination unit 445 determines the transmission power derived from the distribution quantity as the operation parameter applied to the communication device 20.

When exceeded (step S672: No), the second determination unit 445 determines the desired transmission power of the communication device 20 as the operation parameter of the communication device 20. Then, the second determination unit 445 applies the distribution quantity based on the desired transmission power to the communication device 20.

When the application is completed, the second determination unit 445 ends the determination processing.

5. Modification

The embodiment described above illustrates an example, and various changes and applications thereof are possible.

<5-1. Further Information Exchange among Communication Control Apparatuses>

At step S1 of the communication control processing described above, it is assumed that the communication control apparatus 40 exchanges information on the subordinate communication devices 20 with the other communication control apparatuses 40. At this time, the communication control apparatus 40 may further exchange the information on the following (C1) to (C4) with another communication control apparatus 40.

(C1) Information Regarding Grouping of Communication Devices

This information may be exchanged when the communication control apparatuses 40 exchange the information necessary for calculation and perform distributed control of the communication devices 20 (referred to as distributed control hereinafter). For example, the communication control apparatus 40 may exchange the information indicating the standard for grouping with another communication control apparatus 40. Alternatively, the communication control apparatus 40 may exchange the group information itself indicating the result of grouping with another communication control apparatus 40.

Note that exchanging the grouping information for all of the communication devices 20 increases the overhead. Thus, the communication control apparatus 40 may transmit only the information regarding the group including the communication device 20 managed by another communication control apparatus 40 to the other communication control apparatus 40, for example.

FIG. 16 is a diagram illustrating an example of the configuration of the communication system 2 according to the embodiment of the present disclosure. In the case of the example illustrated in FIG. 16, the communication system 2 includes a communication control apparatus $40_3$ and a communication control apparatus $40_4$. The communication control apparatus $40_3$ manages communication devices $20_6$, $20_7$, and $20_8$. The communication control apparatus $40_4$ manages communication devices $20_9$, $20_{10}$, and $20_{11}$. The communication device $20_6$ is classified into a mutual interference group #3, the communication devices $20_7$ to $20_9$ are classified into a mutual interference group #4, and the communication devices $20_{10}$ to $20_{11}$ are classified into a mutual interference group #5.

At this time, the communication control apparatus $40_3$ and the communication control apparatus $40_4$ exchange only the information regarding the mutual interference group #4. That is, the communication control apparatus $40_3$ notifies only the information regarding the mutual interference group #4 to the communication control apparatus $40_4$. The communication control apparatus $40_3$ does not notify, to the communication control apparatus $40_4$, the information regarding the mutual interference group #3 that is not necessary for the communication control apparatus $40_4$. Similarly, the communication control apparatus $40_4$ notifies only the information regarding the mutual interference group #4 to the communication control apparatus $40_3$. The communication control apparatus $40_4$ does not notify, to the communication control apparatus $40_3$, the information regarding the mutual interference group #5 that is not necessary for the communication control apparatus $40_3$. Thereby, the information volume related to information exchange can be reduced.

(C2) Standard for Determining Distribution Quantity of Residual Interference Margin per Group This information may be exchanged when the communication control apparatuses 40 perform distributed control.

(C3) Standard for Determining Distribution Quantity of Residual Interference Margin within Group This information may be exchanged when the communication control apparatuses 40 perform distributed control.

(C4) Distribution Quantity of Residual Interference Margin and/or Transmission Power Derived after Distribution This information may be applied especially to a case where the communication control apparatuses 40 are in a master-slave relation or the like (referred to as centralized control hereinafter). This information is basically desirable to be notified from the master to the slave. The slave performs control of the subordinate communication device 20 based on this information.

<5-2. Avoidance of Collision as Determination Result among Communication Control Apparatuses>

It is assumed that each of the communication control apparatuses 40 described above determines the same operation parameter for a prescribed communication device 20. For example, in the example of FIG. 16, each of the communication control apparatus $40_3$ and the communication control apparatus $40_4$ determines at least the same operation parameter for the three communication devices 20 (the communication devices $20_7$ to $20_9$) belonging to the mutual interference group #4. However, depending on the circumstances, there may have different determination results (adjusted transmission powers) between the communication control apparatuses 40. In that case, regarding the communication device 20 with a different calculation result, for example, a resetting request (a redetermination request) may be transmitted from one of the communication control apparatuses 40 to the other communication control apparatus 40.

For example, in a case of the example of FIG. 16, the transmission unit 446 of the communication control apparatus $40_3$ requests, to the communication control apparatus $40_4$, the operation parameter determined by the second determination unit 445 of the communication control apparatus $40_4$. Furthermore, the acquisition unit 441 of the communication control apparatus $40_3$ acquires the operation parameter from the communication control apparatus $40_4$. At this time, the operation parameter acquired by the communication control apparatus $40_3$ may be the operation parameter of the communication device 20 belonging to the group that includes the communication device 20 managed by the communication control apparatus $40_4$ among the communication devices 20 managed by the communication control apparatus $40_3$. In the case of the example of FIG. 16, the acquisition unit 441 of the communication control apparatus $40_3$ may acquire the operation parameters of the three communication devices 20 (the communication devices $20_7$ to $20_9$) belonging to the mutual interference group #4 from the communication control apparatus $40_4$.

Then, the second determination unit 445 of the communication control apparatus $40_3$ compares the operation parameters determined by itself with the operation parameters acquired from the communication control apparatus $40_4$. For example, the communication control apparatus $40_3$ determines whether the operation parameters of the communication devices $20_7$ to $20_9$ are different from the operation parameters determined by the communication control apparatus $40_3$.

Then, if the operation parameters are different, the transmission unit 446 of the communication control apparatus $40_3$ transmits a resetting request to the communication control apparatus $40_4$. Upon receiving the resetting request, the second determination unit 445 of the communication control apparatus $40_4$ resets (redetermines) the operation parameters of the communication devices 20 (for example, the communication devices $20_7$ to $20_9$). At this time, the acquisition unit 441 of the communication control apparatus $40_4$ may acquire, from the communication control apparatus $40_3$, the operation parameter of the communication device 20 having the different operation parameter among the operation parameters determined by the second determination unit 445 of the communication control apparatus $40_3$. Then, the second determination unit 445 of the communication control apparatus $40_3$ may determine the acquired operation parameter directly as the operation parameter of that communication device 20.

<5-3. Interference to Primary System to be Considered>

It has been described heretofore by assuming the case where the communication devices 20 secondarily utilize the same frequency with the primary system. However, there may also be a case where it is necessary to consider protection of the primary system that uses not only the same frequency but also the adjacent frequency. In that case, the communication control apparatus 40 may correct the calculation of the communication control processing with the parameter such as ACIR (Adjacent Channel Interference Ratio) or ACLR (Adjacent Channel Leakage Ratio). Furthermore, the communication control apparatus 40 may use a characteristic of the primary system, such as blocking of the filter.

<5-4. Case Including Communication Device Causing Interference to a Plurality of Primary Systems>

In the embodiment described above, there is a single primary system (the communication system 1) as the protection target. However, there may be a circumstance where a single communication device 20 interferes with a plurality of primary systems. In such a case, the communication control apparatus 40 determines the operation parameter (including the adjustment quantity of the unadjusted operation parameter) for each of the primary systems per communication device 20 based on the method indicated in the communication control processing described above. That is, the control unit 44 (the first determination unit 442 to the second determination unit 445) of the communication control apparatus 40 determines a plurality of operation parameters corresponding to a plurality of primary systems regarding a single communication device 20. Then, among the operation parameters, the second determination unit 445 determines the operation parameter with which the output of the communication device 20 becomes the smallest (for example, the smallest transmission power) as the operation parameter to be applied to the communication device 20. At this time, the operation parameter may be the adjusted operation parameter or may be the adjustment quantity of the unadjusted operation parameter. Thereby, the cumulative interferences for the primary systems can all be reduced to be smaller than the acceptable interference quantity.

At this time, the communication control apparatus 40 may allocate, to the other communication devices 20, the distribution quantity of the residual interference margin linked to the unselected operation parameter directly as the residual interference margin. Then, the second determination unit 445 may determine the operation parameters of the other communication devices 20 based on the allocated distribution quantity. At this time, the operation parameter may be the adjusted operation parameter or may be the adjustment quantity of the unadjusted operation parameter. More effective utilization of the radio frequency resources can be achieved.

<5-5. Case where Communication Device Belongs to a Plurality of Mutual Interference Groups>

In the embodiment described above, as illustrated in FIG. 12, a single communication device 20 is classified into a single group. However, as a result of grouping, a single communication device 20 may be classified into a plurality of groups. FIG. 17 is a diagram illustrating an example of the configuration of the communication system 2 according to the embodiment of the present disclosure. In the case of the example illustrated in FIG. 17, the communication system 2 includes a communication device $20_{12}$, a communication device $20_{13}$, a communication device $20_{14}$, and a communication device $20_{13}$. The communication devices $20_{12}$ to $20_{13}$ are classified into a mutual interference group #6, and the communication devices $20_{13}$ to $20_{15}$ are classified into a mutual interference group #7. In the example of FIG. 17, the communication device $20_{13}$ belongs to two groups that are the mutual interference group #6 and the mutual interference group #7.

Even in such a case, it is possible to allocate the residual interference margin with a method equivalent to the method indicated in the adjustment processing described above. Specifically, the second determination unit 445 determines, regarding the communication device 20 belonging to a plurality of groups (referred to as plural-group-belonging communication device hereinafter), the distribution quantity of the residual interference margin for each of the groups. For example, in the example of FIG. 17, it is assumed that the second determination unit 445 determines the distribution quantity of the communication device $20_{13}$. At this time, the second determination unit 445 executes the distribution processing illustrated in FIG. 14 for the mutual interference group #6 to determine the distribution quantity to the communication device $20_{13}$. At the same time, the second determination unit 445 executes the distribution processing illustrated in FIG. 14 for the mutual interference group #7 to determine the distribution quantity to the communication device $20_{13}$.

Then, the second determination unit 445 selects the smallest distribution quantity out of a plurality of distribution quantities as the distribution quantity to the plural-group-belonging communication device. For example, referring to the example of FIG. 17, the second determination unit 445 selects, as the distribution quantity to the communication device $20_{13}$, the smaller distribution quantity out of the distribution quantity (referred to as a first distribution quantity hereinafter) to the communication device $20_{13}$ based on the residual interference margin allocated to the mutual interference group #6 and the distribution quantity (referred to as a second distribution quantity hereinafter) to the communication device $20_{13}$ based on the residual interference margin allocated to the mutual interference group #7. Then, the second determination unit 445 determines the operation parameter of the plural-group-belonging communication device based on the selected distribution quantity. At this time, the operation parameter may be the adjusted operation parameter or may be the adjustment quantity of the unadjusted operation parameter. Thereby, in both of the groups, the cumulative interference among the communication devices 20 within the group is reduced to be smaller than the acceptable interference quantity.

Even in such a case, the distribution quantity (unselected distribution quantity) that is not selected among a plurality of distribution quantities may be allocated directly to the other communication devices 20 as the residual interference margin. For example, the unselected distribution quantity may be distributed to the other communication devices 20 within the target group (the group linked to the unselected distribution quantity). For example, it is assumed that the second distribution quantity is selected as the distribution quantity to the communication device $20_{13}$ in the example of FIG. 17. In that case, the second determination unit 445 allocates the first distribution quantity to the other communication devices 20 (the communication device $20_{12}$ and/or the communication device $20_{14}$) belonging to the mutual interference group #6. Then, the second determination unit 445 may determine the operation parameters of the other communication devices 20 based on the allocated distribution quantity. At this time, the operation parameter may be the adjusted operation parameter or may be the adjustment quantity of the unadjusted operation parameter. More effective utilization of the radio frequency resources can be achieved.

<5-6. Modification regarding System Configuration>

The communication control apparatus 40 of the embodiment is not limited to the apparatus described in the embodiment. For example, the communication control apparatus 40 may be an apparatus having a function other than the function of controlling the communication device 20 that secondarily utilize the frequency band subjected to frequency sharing. For example, the network manager may have the functions of the communication control apparatus 40 of the embodiment. At this time, the network manager may be a C-BBU (Centralized Base Band Unit) in a network configuration called C-RAN (Centralized Radio Access Network) or an apparatus including it, for example. Furthermore, the base station (including the access point) may have the functions of the network manager. Those apparatuses (the network manager and the like) can also be considered as the communication control apparatus.

In the embodiment described above, it is described that the communication system 1 is the first wireless system and the communication device 20 is the second wireless system. However, the first wireless system and the second wireless system are not limited to such examples. For example, the first wireless system may be a communication device (for example, the communication device 10), and the second wireless system may be a communication system (the communication system 2). Note that the wireless system referred in the embodiment is not limited to a system configured with a plurality of devices but may be replaced with "device" and "terminal" as appropriate.

Furthermore, while the communication control apparatus 40 is described as the apparatus belonging to the communication system 2 in the embodiment, it is not necessarily an apparatus belonging to the communication system 2. The communication control apparatus 40 may be an apparatus outside the communication system 2. The communication control apparatus 40 may not control the communication device 20 directly but may control the communication device 20 indirectly via a device configuring the communication system 2. Furthermore, there may be a plurality of secondary systems (communication systems 2). At this time, the communication control apparatus 40 may manage a plurality of secondary systems. In that case, each of the secondary systems may be considered as the second wireless system.

In frequency sharing in general, the incumbent system using the target band is called a primary system and the secondary user is called a secondary system. However, the primary system and the secondary system may be called by other terms. A macro cell in HetNET (Heterogeneous Network) may be a primary system, and a small cell and a relay station may be secondary systems. Furthermore, the base station may be a primary system, and Relay UE and Vehicle UE implementing D2D and V2X (Vehicle-to-Everything) existing within the coverage thereof may be secondary systems. The base station is not limited to a fixed type but may be a portable or mobile type.

Furthermore, the interface between entities may be a wired or wireless interface. For example, the interface between the entities (the communication control apparatuses, the communication devices, or the terminal devices) referred in the embodiment may be a wireless interface that does not depend on frequency sharing. Examples of the wireless interface that does not depend on frequency sharing may be a wireless interface provided by a mobile network operator via a Licensed band, and wireless LAN communication using an incumbent unlicensed band.

<5-7. Another Modification>

The control apparatus that controls the communication device 10, the communication device 20, the terminal device 30, and the communication control apparatus 40 according to the embodiment may be achieved by a dedicated computer system or may be achieved by a general-purpose computer system.

For example, the communication program for executing the above-described operations (for example, the communication control processing, the adjustment processing, and the distribution processing) is stored in a computer readable recording medium such as an optical disc, a semiconductor memory, a magnetic tape, or a flexible disk and distributed. Then, for example, the program is installed in a computer and the processing described above is executed to configure a control apparatus. At this time, the control apparatus may be an apparatus (for example, a personal computer) outside the communication device 10, the communication device 20, the terminal device 30, and the communication control apparatus 40. The control apparatus may also be a device (for example, the control unit 24, the control unit 34, or the control unit 44) inside the communication device 10, the communication device 20, the terminal device 30, or the communication control apparatus 40.

Furthermore, for example, the communication program may be stored in a disk device provided in a server device on a network such as the Internet and allowed to be downloaded on a computer. The functions described above may be implemented by an OS (Operating System) and application software in cooperation. In that case, the part other than the OS may be stored in a medium and distributed, or the part other than the OS may be stored in the server device to be downloaded or the like in a computer.

Furthermore, among pieces of processing described in the embodiment, the whole or a part of the processing described to be performed automatically may be performed manually, or the whole or a part of the processing described to be performed manually may be performed automatically by a known method. Moreover, the information including the processing procedure, specific names, and various kinds of data mentioned in the description and the drawings may be changed freely unless specifically noted. For example, various kinds of information illustrated in each of the drawings is not limited to the information illustrated therein.

Furthermore, each of the constituent elements of each of the devices illustrated in the drawings is the functional concept, and not necessarily configured physically as illustrated therein. That is, specific distributed or integrated form of each of the devices is not limited to that illustrated in the drawings but the whole of a part thereof may be configured in a distributed or integrated manner functionally or physically in an any unit depending on various loads, use conditions, and the like.

Furthermore, in the embodiment described above, the processing contents can be combined as appropriate in a range causing no conflict. Furthermore, the order of the steps illustrated in the sequence chart or the flowcharts of the embodiment can be changed as appropriate.

6. Conclusion

As described above, according to the embodiment of the present disclosure, the communication control apparatus 40 determines the adjustment quantity of the operation parameters of the communication devices 20 belonging to a prescribed set based on the information on the residual interference margin. That is, the communication control apparatus 40 distributes the residual interference margin to the communication devices 20 to enable transmission of radio wavers with higher output. This makes it possible for the communication device 20 to communicate with a terminal device at a distant and to communicate with a greater number of terminal devices at once. As a result, the communication control apparatus 40 can achieve effective utilization of the radio frequency resources.

Furthermore, the communication control apparatus 40 classifies the communication devices 20 into a single or a plurality of groups (sets). Then, the communication control apparatus 40 allocates a part or whole of the residual interference margin to a prescribed set, and determines the adjustment quantity of the operation parameters of the communication devices 20 belonging to the prescribed set based on the information on the residual interference margin allocated to the prescribed set. This makes it possible to reduce the calculation amount for determining the adjustment quantity of the operation parameters.

By making the groups (sets) as the mutual interference groups, the communication control apparatus 40 can distribute the residual interference margin to each of the groups without considering the radio interference between the groups. The communication control apparatus 40 may consider only the mutual interference between the communication devices 20 within the group when distributing the residual interference margin. Thus, by setting the groups (sets) as the mutual interference groups, the communication control apparatus 40 can determine the adjustment quantity of the operation parameters extremely easily.

Furthermore, the communication control apparatus 40 does not distribute the residual interference margin to the non-adjustable group (non-adjustable set) and/or the adjustment unnecessary group (adjustment unnecessary set). Thus, the communication control apparatus 40 does not waste the residual interference margin, so that more effective utilization of the radio frequency resources can be achieved.

Furthermore, to the communication devices 20, the communication control apparatus 40 allocates a larger interference quantity in order from the one having a larger deviation between the maximum acceptable transmission power and the desired transmission power. That is, the communication control apparatus 40 allocates the interference quantity in order from the one having a larger effect of allocating the interference quantity. This makes it possible to increase the distribution efficiency of the residual interference margin, so that the communication control apparatus 40 can achieve more effective utilization of the radio frequency resources.

While each of the embodiments of the present disclosure has been described heretofore, the technical scope of the present disclosure is not limited to each of the above-described embodiments, and various changes are possible without departing from the gist of the present disclosure. Furthermore, constituent elements of different embodiments or modifications may be combined as appropriate.

Furthermore, effects of each of the embodiments described in the specification are not limited thereto but simply presented as examples, and there may also be other effects.

Note that the present techniques may employ the following configurations.

(1)

A communication control apparatus, comprising: an acquisition unit that acquires information on a plurality of second wireless systems that perform wireless communication by utilizing a radio wave of a frequency band used by a first wireless system;

a first determination unit that determines, based on the information on the second wireless systems, an operation parameter regarding radio transmission of each of the second wireless systems so as to satisfy a protection standard regarding interference of the radio wave of the first wireless system;

a calculation unit that calculates a residual interference quantity that is allowed to be additionally allocated to the second wireless systems based on the operation parameter determined by the first determination unit and the protection standard of the first wireless system;

a classification unit that classifies the second wireless systems into a single or a plurality of sets; and a second determination unit that determines, based on information on the residual interference quantity, an adjustment quantity of the operation parameter of the second wireless system belonging to a prescribed set out of the single or plurality of sets.

(2)

The communication control apparatus according to (1), wherein the second determination unit allocates a part or whole of the residual interference quantity to the prescribed set, and determines the adjustment quantity of the operation parameter of the second wireless system belonging to the prescribed set based on the information on the residual interference quantity allocated to the prescribed set.

(3)

The communication control apparatus according to (2), wherein the classification unit classifies the second wireless systems into a single or a plurality of sets based on whether the second wireless systems mutually interfere with each other.

(4)

The communication control apparatus according to (2) or (3), wherein the acquisition unit acquires coverage information regarding a coverage of wireless communication of each of the second wireless systems, and the classification unit classifies the second wireless systems into a single or a plurality of sets based on the coverage information.

(5)

The communication control apparatus according to (4), wherein the classification unit identifies, from the second wireless systems, second wireless systems having the coverages overlapping with each other based on the coverage information, and classifies the identified second wireless systems into the prescribed set.

(6)

The communication control apparatus according to (2) or (3), wherein the acquisition unit acquires transmission power class information regarding a transmission power class of each of the second wireless systems, and the classification unit classifies the second wireless systems into a single or a plurality of sets based on the transmission power class information.

(7)

The communication control apparatus according to (6), wherein the classification unit identifies, from the second wireless systems, a second wireless system of a prescribed transmission power class based on the transmission power class information, and classifies the identified second wireless system into the prescribed set.

(8)

The communication control apparatus according to (2) or (3), wherein, among the second wireless systems, a plurality of second wireless systems forming a single cell are classified into the prescribed set.

(9)

The communication control apparatus according to any one of (2) to (8), wherein the second determination unit determines, from the single or plurality of sets, a non-adjustable set in which all of the belonging second wireless systems are unable to adjust the operation parameter and, without allocating the residual interference quantity to the non-adjustable set, allocates a part or whole of the residual interference quantity to another set including at least one of the second wireless systems capable of adjusting the operation parameter.

(10)

The communication control apparatus according to (9), wherein the acquisition unit acquires information regarding a hardware configuration of each of the second wireless systems, and the second determination unit determines, as a non-adjustable set, a set in which all of the belonging second wireless systems are unable to adjust the operation parameter in terms of the hardware configuration.

(11)

The communication control apparatus according to any one of (2) to (10), wherein the second determination unit determines, from the single or plurality of sets, an adjustment unnecessary set in which all of the belonging second wireless systems are unnecessary to adjust the operation parameter and, without allocating the residual interference quantity to the adjustment unnecessary set, allocates a part or whole of the residual interference quantity to another set including at least one of the second wireless systems capable of adjusting the operation parameter.

(12)

The communication control apparatus according to (11), wherein the acquisition unit acquires information regarding a desired transmission power of each of the second wireless system, and the second determination unit determines, as an adjustment unnecessary set, a set in which all of the belonging second wireless systems satisfy the desired transmission power.

(13)

The communication control apparatus according to any one of (2) to (12), wherein the first determination unit calculates a maximum acceptable transmission power of each of the second wireless systems, and the second determination unit determines the adjustment quantity of the operation parameter of the second wireless system belonging to the prescribed set based on an extent of deviation between the maximum acceptable transmission power calculated by the first determination unit and a desired transmission power desired by the second wireless system.

(14)

The communication control apparatus according to (13), wherein the second determination unit allocates a larger interference quantity in a descending order of the deviation to the second wireless systems belonging to the prescribed set, and determines the adjustment quantity of the operation parameter based on the allocated interference quantity.

(15)

The communication control apparatus according to any one of (2) to (14), wherein, when a prescribed second wireless system as one of the second wireless systems belongs to a plurality of sets, the second determination unit determines a distribution quantity of the residual interference quantity to the prescribed second wireless system for each of the sets, selects, as the distribution quantity to the prescribed second wireless system, a smallest distribution quantity among a plurality of determined distribution quantities, and determines the adjustment quantity of the operation parameter of the prescribed second wireless system based on the selected distribution quantity.

(16)

The communication control apparatus according to (15), wherein the second determination unit allocates an unselected distribution quantity out of the distribution quantities to another second wireless system, and determines the adjustment quantity of the operation parameter of the other second wireless system based on the allocated distribution quantity.

(17)

The communication control apparatus according to any one of (1) to (16), wherein the operation parameter determined by the determination unit of the first determination unit includes a maximum acceptable transmission power that is a largest transmission power acceptable to the second wireless system, and the second determination unit determines the adjustment quantity of the maximum acceptable transmission power determined by the first determination unit.

(18)

The communication control apparatus according to any one of (1) to (17), further comprising a transmission unit that transmits, to the second wireless system, a second operation parameter including at least either the adjustment quantity determined by the second determination unit or the operation parameter adjusted according to the adjustment quantity.

(19)

The communication control apparatus according to any one of (1) to (18), wherein the first wireless system is a first communication system that uses a radio wave of a prescribed frequency band, and the second wireless system is a communication device provided to a second communication system that utilizes the radio wave of the prescribed frequency band used by the first communication system.

(20)

The communication control apparatus according to (19), in which the first communication system is a primary system that is given a priority to the second communication system to use the radio wave of the prescribed frequency band, and the second communication system is a secondary system that secondarily utilizes the radio wave in the frequency band used by the first communication system.

(21)

A communication control method, comprising:

acquiring information on a plurality of second wireless systems that perform wireless communication by utilizing a radio wave of a frequency band used by a first wireless system;

determining, based on the information on the second wireless systems, an operation parameter regarding radio transmission of each of the second wireless systems so as to satisfy a protection standard regarding interference of the radio wave of the first wireless system;

calculating a residual interference quantity that is allowed to be additionally allocated to the second wireless systems based on the operation parameter determined by the first determination unit and the protection standard of the first wireless system;

classifying the second wireless systems into a single or a plurality of sets; and determining, based on information on the residual interference quantity, an adjustment quantity of the operation parameter of the second wireless system belonging to a prescribed set out of the single or plurality of sets.

(22)

A communication control computer program causing a computer provided by a communication control apparatus to function as:

an acquisition unit that acquires information on a plurality of second wireless systems that perform wireless communication by utilizing a radio wave in a frequency band used by a first wireless system;

a first determination unit that determines, based on the information on the second wireless systems, an operation parameter regarding radio transmission of each of the second wireless systems so as to satisfy a protection standard regarding interference of the radio wave of the first wireless system;

a calculation unit that calculates a residual interference quantity that is allowed to be additionally allocated to the second wireless systems based on the operation parameter determined by the first determination unit and the protection standard of the first wireless system;

a classification unit that classifies the second wireless systems into a single or a plurality of sets; and a second determination unit that determines, based on information on the residual interference quantity, an adjustment quantity of the operation parameter of the second wireless system belonging to a prescribed set out of the single or plurality of sets.

(23)

A communication system, including: a plurality of second wireless systems that performs wireless communication by utilizing a radio wave in a frequency band used by a first wireless system, and a communication control apparatus that controls the second wireless systems, in which the communication control apparatus includes:

an acquisition unit that acquires information on the second wireless systems;

a first determination unit that determines, based on the information on the second wireless systems, an operation parameter regarding radio transmission of each of the second wireless systems so as to satisfy a protection standard regarding interference of the radio wave of the first wireless system;

a calculation unit that calculates a residual interference quantity that is allowed to be additionally allocated to the second wireless systems based on the operation parameter determined by the first determination unit and the protection standard of the first wireless system;

a classification unit that classifies the second wireless systems into a single or a plurality of sets; and a second determination unit that determines, based on information on the residual interference quantity, an adjustment quantity of the operation parameter of the second wireless system belonging to a prescribed set out of the single or plurality of sets.

REFERENCE SIGNS LIST 1, 2 Communication system
10, 20 Communication device
30 Terminal device
40 Communication control apparatus
21, 31, 41 Wireless communication unit
22, 32, 42 Storage unit
23, 43 Network communication unit
24, 34, 44 Control unit
211, 311 Reception processing unit
212, 312 Transmission processing unit
241, 441 Acquisition unit
242 Determination unit
243 Setting unit
244, 446 Transmission unit
442 First determination unit
443 Calculation unit
444 Classification unit
445 Second determination unit

The invention claimed is:

1. A communication control apparatus, comprising:
an acquisition unit that acquires information on a plurality of second wireless systems that perform wireless communication by utilizing a radio wave of a frequency band used by a first wireless system;
a first determination unit that determines, based on the information on the plurality of second wireless systems, an operation parameter regarding radio transmission of each of the plurality of second wireless systems so as to satisfy a protection standard regarding interference of the radio wave of the first wireless system;
a calculation unit that calculates a residual interference quantity that is allowed to be additionally allocated to the plurality of second wireless systems based on the operation parameter determined by the first determination unit and the protection standard of the first wireless system;
a classification unit that classifies the plurality of second wireless systems into a single or a plurality of sets; and
a second determination unit that determines, based on information on the residual interference quantity, an adjustment quantity of the operation parameter of the plurality of second wireless systems belonging to a prescribed set out of the single or the plurality of sets.

2. The communication control apparatus according to claim 1, wherein the second determination unit allocates a part or whole of the residual interference quantity to the prescribed set, and determines the adjustment quantity of the operation parameter of the plurality of second wireless system belonging to the prescribed set based on the information on the residual interference quantity allocated to the prescribed set.

3. The communication control apparatus according to claim 2, wherein the classification unit classifies the plurality of second wireless systems into the single or the plurality of sets based on whether the plurality of second wireless systems mutually interfere with each other.

4. The communication control apparatus according to claim 2, wherein
the acquisition unit acquires coverage information regarding a coverage of wireless communication of each of the plurality of second wireless systems, and
the classification unit classifies the plurality of second wireless systems into the single or the plurality of sets based on the coverage information.

5. The communication control apparatus according to claim 4, wherein the classification unit identifies, from the plurality of second wireless systems, second wireless systems having the coverages overlapping with each other based on the coverage information, and classifies the identified second wireless systems into the prescribed set.

6. The communication control apparatus according to claim 2, wherein
the acquisition unit acquires transmission power class information regarding a transmission power class of each of the plurality of second wireless systems, and
the classification unit classifies the plurality of second wireless systems into the single or the plurality of sets based on the transmission power class information.

7. The communication control apparatus according to claim 6, wherein the classification unit identifies, from the plurality of second wireless systems, a second wireless system of a prescribed transmission power class based on the transmission power class information, and classifies the identified second wireless system into the prescribed set.

8. The communication control apparatus according to claim 2, wherein, among the plurality of second wireless systems, a plurality of second wireless systems forming a single cell are classified into the prescribed set.

9. The communication control apparatus according to claim 2, wherein the second determination unit determines, from the single or the plurality of sets, a non-adjustable set in which all of the belonging second wireless systems are unable to adjust the operation parameter and, without allocating the residual interference quantity to the non-adjustable set, allocates the part or the whole of the residual interference quantity to another set including at least one of the plurality of second wireless systems capable of adjusting the operation parameter.

10. The communication control apparatus according to claim 9, wherein
the acquisition unit acquires information regarding a hardware configuration of each of the plurality of second wireless systems, and
the second determination unit determines, as the non-adjustable set, a set in which all of the belonging plurality of second wireless systems are unable to adjust the operation parameter in terms of the hardware configuration.

11. The communication control apparatus according to claim 2, wherein the second determination unit determines, from the single or the plurality of sets, an adjustment unnecessary set in which all of the belonging plurality of second wireless systems are unnecessary to adjust the operation parameter and, without allocating the residual interference quantity to the adjustment unnecessary set, allocates the part or the whole of the residual interference quantity to another set including at least one of the plurality of second wireless systems capable of adjusting the operation parameter.

12. The communication control apparatus according to claim 11, wherein
the acquisition unit acquires information regarding a desired transmission power of each of the plurality of second wireless system, and
the second determination unit determines, as the adjustment unnecessary set, a set in which all of the belonging plurality of second wireless systems satisfy the desired transmission power.

13. The communication control apparatus according to claim 2, wherein
the first determination unit calculates a maximum acceptable transmission power of each of the plurality of second wireless systems, and
the second determination unit determines the adjustment quantity of the operation parameter of the plurality of second wireless systems belonging to the prescribed set based on an extent of deviation between the maximum acceptable transmission power calculated by the first determination unit and a transmission power desired by the plurality of second wireless systems.

14. The communication control apparatus according to claim 13, wherein the second determination unit allocates a larger interference quantity in a descending order of the deviation to the plurality of second wireless systems belonging to the prescribed set, and determines the adjustment quantity of the operation parameter based on the allocated larger interference quantity.

15. The communication control apparatus according to claim 2, wherein, when a prescribed second wireless system as one of the plurality of second wireless systems belongs to the plurality of sets, the second determination unit determines a distribution quantity of the residual interference quantity to the prescribed second wireless system for each of the plurality of sets, selects, as the distribution quantity to the prescribed second wireless system, a smallest distribution quantity among a plurality of determined distribution quantities, and determines the adjustment quantity of the operation parameter of the prescribed second wireless system based on the selected distribution quantity.

16. The communication control apparatus according to claim 15, wherein the second determination unit allocates an unselected distribution quantity out of the plurality of determined distribution quantities to another second wireless system, and determines the adjustment quantity of the operation parameter of the another second wireless system based on the allocated unselected distribution quantity.

17. The communication control apparatus according to claim 1, wherein
the operation parameter determined by the first determination unit includes a maximum acceptable transmission power that is a largest transmission power acceptable to the plurality of second wireless systems, and
the second determination unit determines the adjustment quantity of the maximum acceptable transmission power determined by the first determination unit.

18. The communication control apparatus according to claim 1, further comprising a transmission unit that transmits, to the plurality of second wireless system, a second operation parameter including at least either the adjustment quantity determined by the second determination unit or the operation parameter adjusted according to the adjustment quantity.

19. The communication control apparatus according to claim 1, wherein
the first wireless system is a first communication system that uses the radio wave of a prescribed frequency band, and
the plurality of second wireless system is a communication device provided to a second communication system that utilizes the radio wave of the prescribed frequency band used by the first communication system.

20. A communication control method, comprising:

acquiring information on a plurality of second wireless systems that perform wireless communication by utilizing a radio wave of a frequency band used by a first wireless system;

determining, by a first determination unit, based on the information on the plurality of second wireless systems, an operation parameter regarding radio transmission of each of the plurality of second wireless systems so as to satisfy a protection standard regarding interference of the radio wave of the first wireless system;

calculating a residual interference quantity that is allowed to be additionally allocated to the plurality of second wireless systems based on the operation parameter determined by the first determination unit and the protection standard of the first wireless system;

classifying the plurality of second wireless systems into a single or a plurality of sets; and determining, based on information on the residual interference quantity, an adjustment quantity of the operation parameter of the plurality of second wireless system belonging to a prescribed set out of the single or the plurality of sets.

* * * * *